TYPEWRITER CONTROLLED TAPE PUNCH
Filed Oct. 10, 1951 23 Sheets-Sheet 1
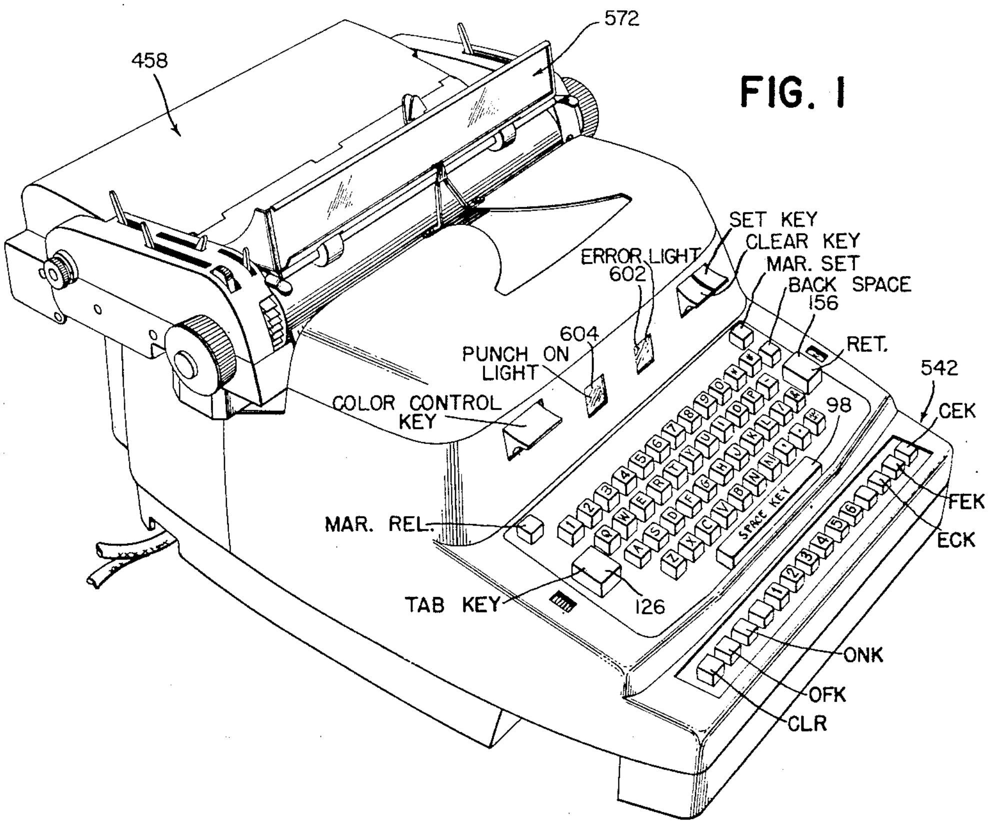
FIG. 1
FIG. 2
| | |
|---|---|
| CEK | CARD ERROR KEY |
| CLR | CLEAR KEY |
| ECK | END OF CARD KEY |
| FEK | FIELD ERROR KEY |
| OFK | PUNCH OFF KEY |
| ONK | PUNCH ON KEY |
| MAR REL | MARGIN RELEASE KEY |
| MAR SET | MARGIN SET KEY |
| RET | CARRIAGE RETURN KEY |
| RETURN | CARRIAGE RETURN KEY |
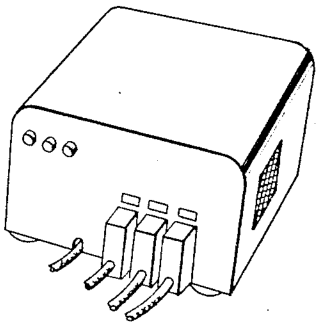
FIG. 3
INVENTOR
CHARLES R DOTY
BY Robert S. Dunham
ATTORNEY March 12, 1957 C. R. DOTY 2,784,785

TYPEWRITER CONTROLLED TAPE PUNCH

Filed Oct. 10, 1951 23 Sheets-Sheet 2

INVENTOR
CHARLES R. DOTY

BY Robert S. Dunham

ATTORNEY

INVENTOR
CHARLES R. DOTY
BY Robert S. Dunham
ATTORNEY

INVENTOR
CHARLES R DOTY
BY Robert S. Dunham
ATTORNEY

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 6

INVENTOR
CHARLES R. DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 7

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 8

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 9

INVENTOR
CHARLES R. DOTY

BY Robert S. Dunham

ATTORNEY

TYPEWRITER CONTROLLED TAPE PUNCH

Filed Oct. 10, 1951

INVENTOR
CHARLES R DOTY
BY Robert S. Dunham
ATTORNEY

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 12

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 13

INVENTOR
CHARLES R DOTY
BY Robert S. Dunham
ATTORNEY

INVENTOR
CHARLES R. DOTY
BY Robert S. Dunham
ATTORNEY

INVENTOR
CHARLES R DOTY
BY Robert S. Dunham
ATTORNEY

DOCUMENT B

INVENTOR
CHARLES R DOTY

BY Robert S. Dunham

ATTORNEY

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 18

INVENTOR
CHARLES R DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 19

INVENTOR
CHARLES R. DOTY
BY Robert S. Denham
ATTORNEY

INVENTOR
CHARLES R DOTY
BY Robert S. Dunham
ATTORNEY

INVENTOR
CHARLES R. DOTY
BY Robert S. Dunham
ATTORNEY

March 12, 1957 C. R. DOTY 2,784,785

TYPEWRITER CONTROLLED TAPE PUNCH

Filed Oct. 10, 1951 23 Sheets-Sheet 22

INVENTOR
CHARLES R. DOTY

BY Robert S. Dunham

ATTORNEY

March 12, 1957 C. R. DOTY 2,784,785

TYPEWRITER CONTROLLED TAPE PUNCH

Filed Oct. 10, 1951 23 Sheets-Sheet 23

INVENTOR.
CHARLES R. DOTY

BY Robert S. Dunham

ATTORNEY 2,784,785
Patented Mar. 12, 1957

2,784,785

TYPEWRITER CONTROLLED TAPE PUNCH

Charles R. Doty, Poughkeepsie, N. Y., assignor to International Business Machines Corporation, New York, N. Y., a corporation of New York Application October 10, 1951, Serial No. 250,647

13 Claims. (Cl. 164—113)

This invention relates to a typewriter controlled tape punch and more particularly to means for typing documents and for simultaneously punching all, or selected portions only, of the typed data into a tape.

In Patent No. 2,340,801, dated February 1, 1944, granted to Edward J. Rabenda and me, there is disclosed a record controlled, perforating apparatus which has as a primary purpose the provision of improved mechanism by the use of which information recorded on telegraphic tape may be recorded on statistical tabulating sheets or cards by punching.

It is a primary purpose of the instant invention to provide apparatus including a modified typewriter structure and a tape punch for preparing perforated tapes adapted to control tabulating card or sheet punching mechanism similar to that shown in the aforesaid patent.

It is a further object of the invention to provide a typewriting mechanism which is modified to control a tape punch for punching into a tape selected portions of data being concurrently written on a document in the typewriter.

It is a further object of the invention to provide typewriter control mechanism for tape punches in which a plurality of predetermined data selecting programs may be installed, for selection by mere key depression by an operator, whereby certain data, less than the total document data, may be punched, by a keyboard, into a tape without further attention by the operator, as regards the programming.

It is a further object of the invention to type a document, and simultaneously punch into a tape, data from a plurality of all document data fields in such manner that document printing in the typewriter may begin at the left hand margin of each data field and card or sheet punching, as in our aforesaid joint patent, under control of a tape so produced, will result in the punching of data, all aligned at the right hand margin of each data field of the statistical card or sheet.

It is a further object of the invention to provide for the punching of a control tape during the left hand alignment of alphabetical data and right hand alignment of numerical data on the document being typed so that when the tape is used for the production of perforated statistical cards or sheets, as in the above mentioned patent, the numerical data punched into the card or sheet will be aligned from the right and alphabetical data punched in the card will be aligned from the left.

It is a further object of the invention to provide in the device as indicated certain error indication signals which will assist the operator to effect document error corrections, and at the same time apprise him to a degree of certainty that any tape errors resulting from the typing of document errors have been corrected. To this end there is provided signal means operative both as to field errors and as to card errors.

Other important objects and advantages of the invention will appear as a description thereof proceeds with reference to the drawings in which like reference numerals indicate like parts, and in which:

Fig. 1 is a perspective, external view of a typewriter modified in accordance with this invention;

Fig. 2 is a schedule showing the full names of abbreviated key captions;

Fig. 3 is an external, perspective view of a power supply and relay unit, which, together with the tape perforating unit of Fig. 2 and the modified typewriter unit of Fig. 1, are interconnected by electric cables to form the apparatus of the invention;

Figure 30:
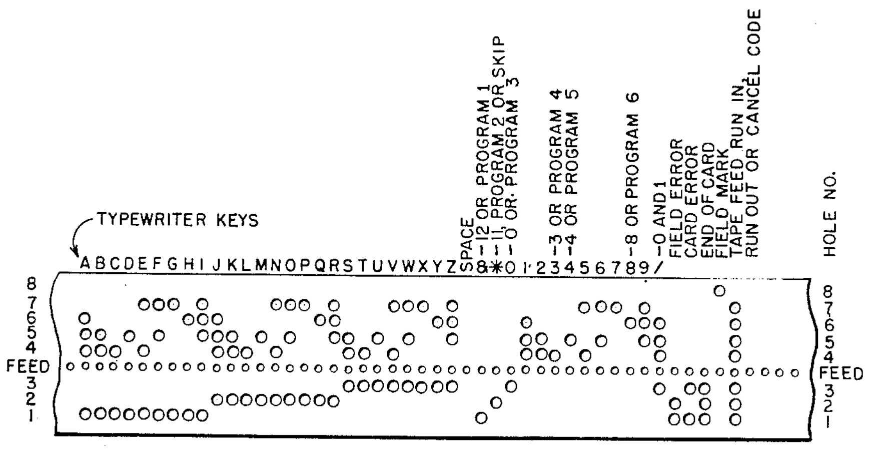
Figure 31:
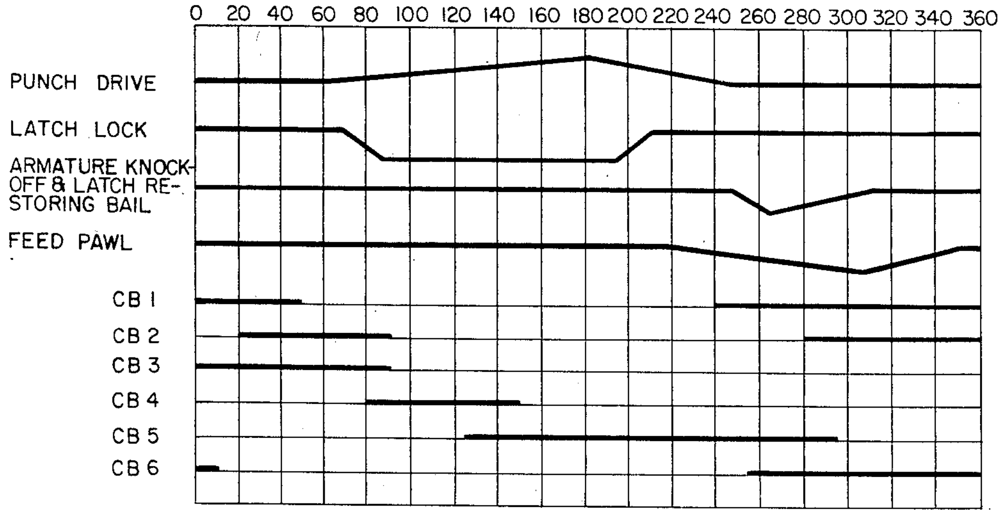

Figs. 29, 29*a*, 29*b*, 29*c* and 29*d* together constitute the control circuit employed herein;

Fig. 30 illustrates a section of perforated tape showing the coding thereof for alphabetic and numerical data as well as for certain functional operations; and Fig. 31 is a timing diagram.

Figure 4:
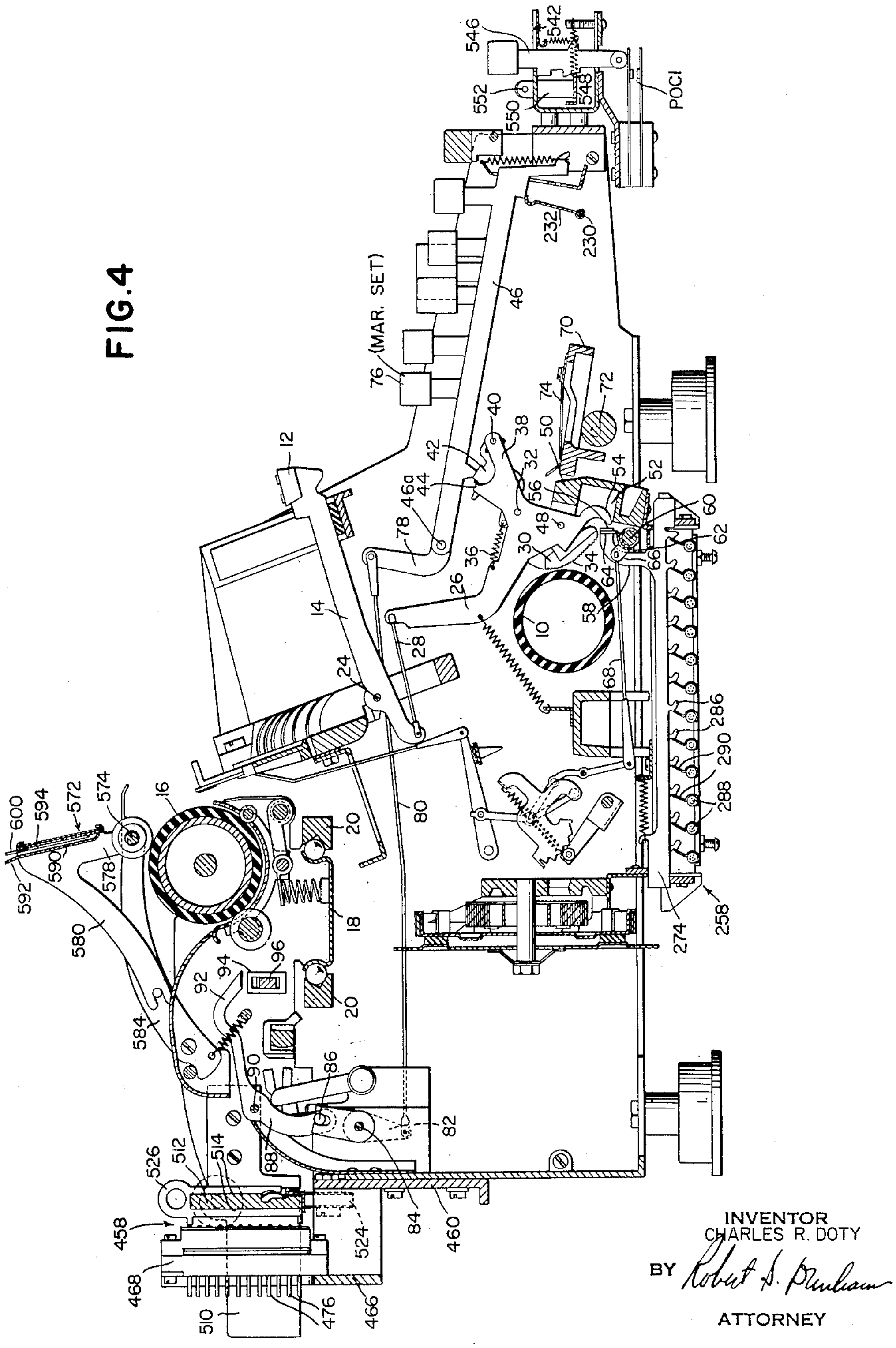
Fig. 4 is a medial, cross-sectional view in a vertical plane of the modified typewriter unit.
Figure 5:
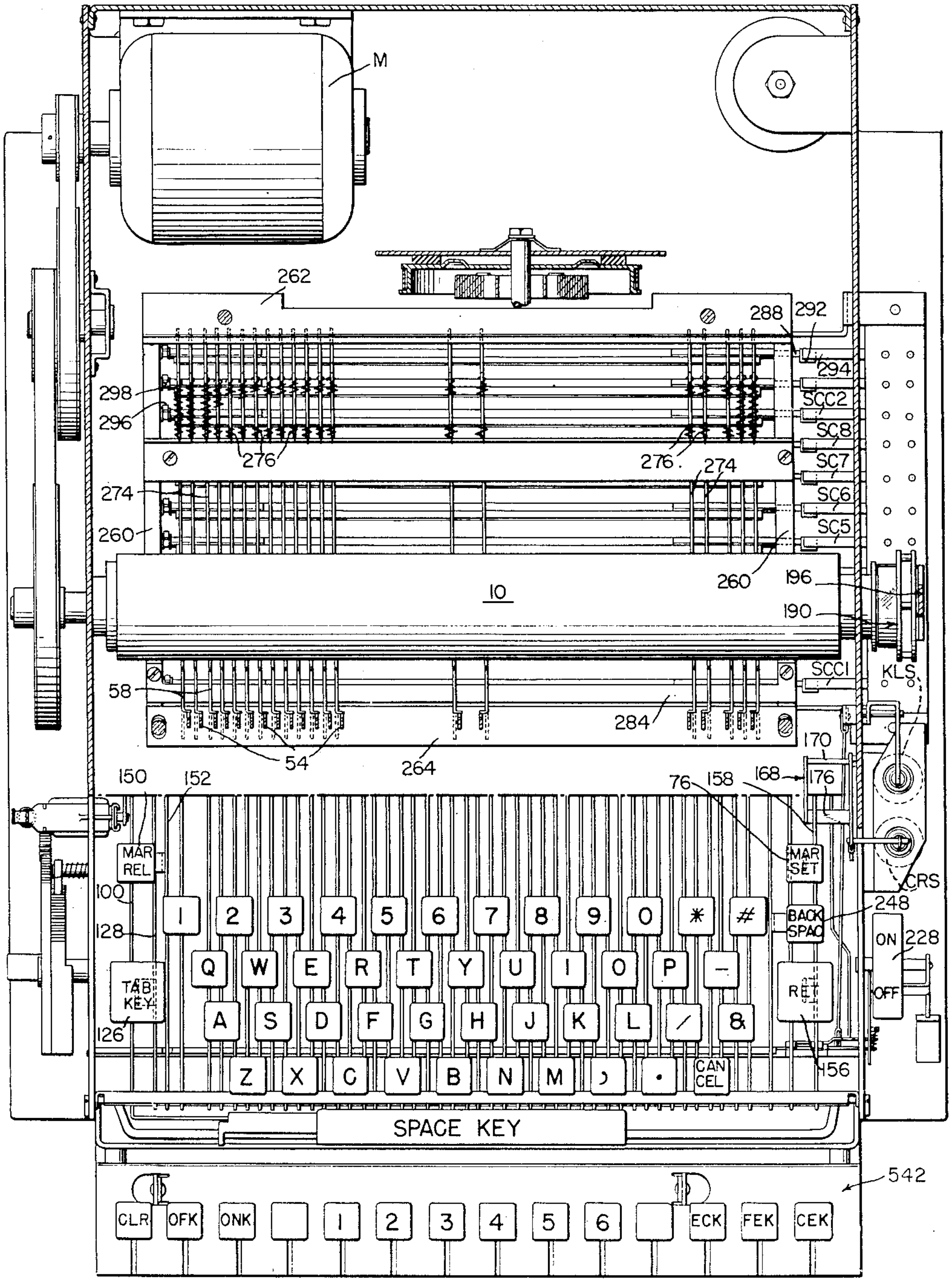
Fig. 5 is a horizontal, cross-sectional view through the modified typewriter unit.
Figure 6:
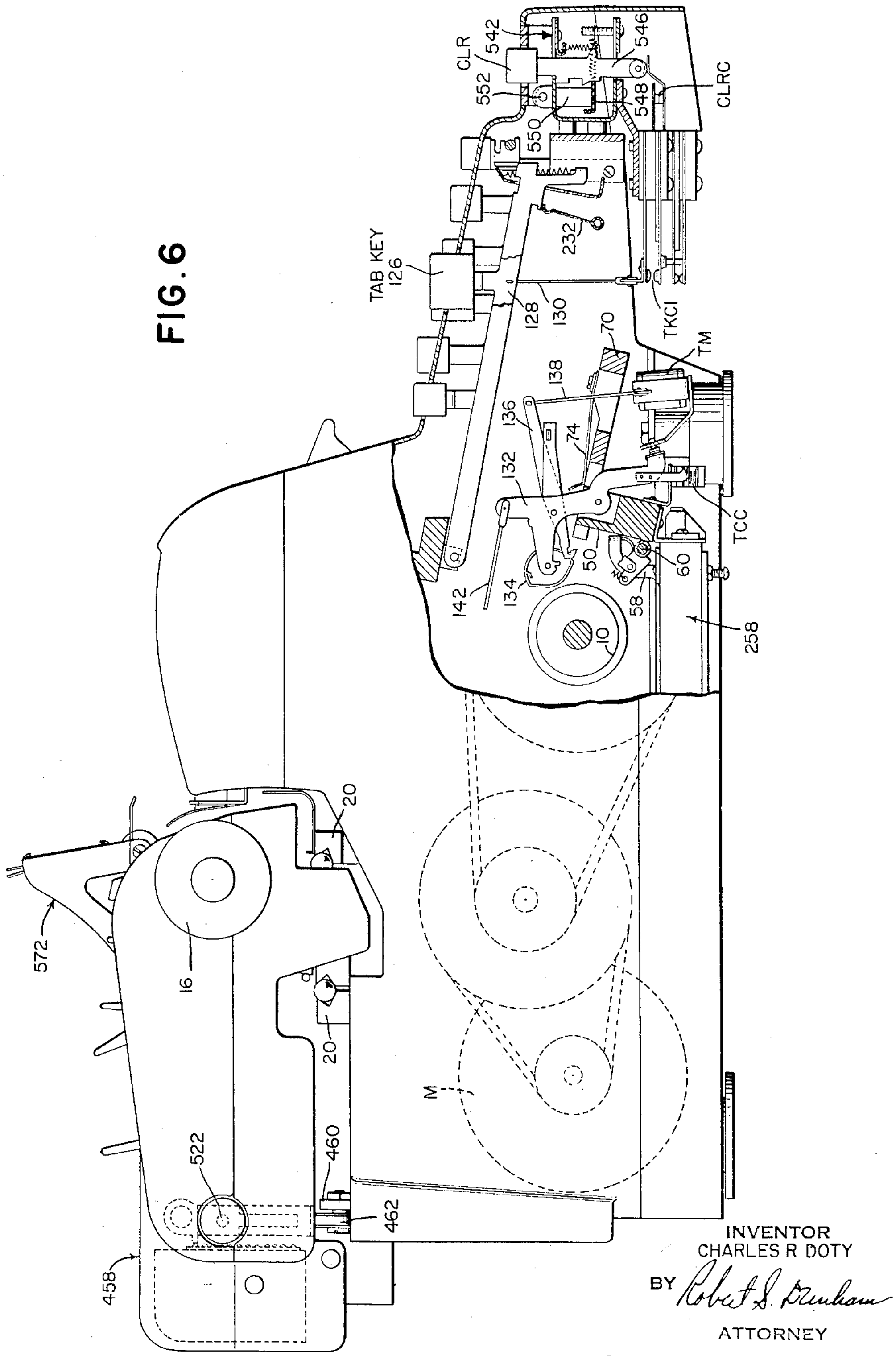
Fig. 6 is a side elevational view of the typewriter unit with parts of the casing broken away to show certain underlying structure.

The printing action of the typewriter illustrated herein and to which the present improvements are applied is adapted for power operation under the influence of a continuously rotating power roller 10 which is driven in any well known manner as by an electric motor M (Fig. 5). By reference to Fig. 4 it will be seen that each type face 12 is carried by a type bar 14 which is adapted to be operated into impression making contact with a record receiving sheet trained about a platen 16. The platen is carried in a carriage 18 adapted to reciprocate on rails 20.

Each type bar 14 is pivoted on a type bar segment wire 24 about which it is rocked under the influence of a sub-lever 26 to which it is connected by means of a link 28. Each sub-lever is adapted for operation by a power cam 30 which is pivoted to its sub-lever by means of a pivot stud or cam rivet 32. The sub-levers 26 and the power cams 30 are normally, i. e. in inoperative position, so disposed that a serrated surface 34 on each cam 30 is slightly spaced from the rotating power roller 10. This position of the cams 30 is maintained by means of an associated spring 36 which has one end thereof attached to its cam at a point above the pivot stud 32 and which has its other end attached to a rearwardly projecting portion of its sub-lever 26. As a consequence of the spring tension, the cams are normally biased about their pivot studs 32 in a counterclockwise direction to such an extent as to provide a small space between the serrated surface 34 of the cams and the peripheral surface of the power roller 10.

The upper forward end of each sub-lever 26 has a projecting ear 38 from which extends a lateral stud 40 which is adapted to engage in an elongated slot formed in an upstanding ear of a latch 42, the opposite end of the latch member being embraced by an inturned ear 44 in the upper end of the forwardly projecting portion of its sub-lever 26. A spring (not shown) tends to hold the latch 42 in its forwardly disposed position.

A manually operable key lever 46 is pivoted on a fulcrum wire **46*a* for operative contact with each latch member 42, whereby downward movement thereon will rock the associated cam 30 in a clockwise direction to project its serrated surface 34 into contact with the power roller 10. Whenever a serrated surface 34 of a cam 30 is brought into contact with the continuously rotating power roller 10, the cam 30 will be rocked in a clockwise direction, and because of the eccentricity thereof the point of connection between the sub-lever 26 and cam 30 will be moved forwardly, thereby rocking the sub-lever 26 about its pivot point 48. Such motion is, of course, effective to rock the sub-lever 26 in a clockwise direction and through the link 28 rock the type bar 14 in a counterclockwise direction about its segment wire 24**, thereby imparting a printing stroke to the type bar.

The sub-lever pivot 48 is carried in a frame member 50 which has a recess 52 adapted to accommodate a downwardly projecting finger 54 formed in the lower portion of the sub-lever 26. When the sub-lever 26 is rocked in a clockwise direction about its pivot 48, the finger 54 thereof will rock into contact with a flange 56 formed in an upstanding finger 58 of a selector bar for a purpose to be described more fully hereinafter. At the rear of the frame 50 is a transverse bar 60 on which is carried a sleeve 62. The sleeve 62 has an upstanding flange 64 which lies in contact with the flange 56 of the selector bar finger 58 so that whenever the downwardly projecting portion 54 of the sub-lever 26 is rocked about its pivot in a clockwise direction and the downwardly projecting finger 54 comes into operative contact with the flange 56, the upstanding flange 64 of the sleeve 62 will be rotated. Attached for rotation with the sleeve 62 is an ear 66 to which is attached a link 68 adapted to operate the ribbon lift linkage in well known manner.

Positioned forwardly of the frame member 50 is a cam knock-out bar 70 pivoted in the sides of the typewriter frame so that its rear edge is free to oscillate on horizontal axes. Such oscillation is imparted to the cam knock-out bar by means of a continuously rotating cam knock-out bar eccentric 72 positioned directly under the cam knock-out bar 70 and providing a support and actuator for the cam knock-out bar. To the upper surface of the cam knock-out bar are attached a series of spring fingers 74 which are located in alignment with the cams 30 so that when the cam assembly is rocked forwardly, i. e. in a clockwise direction about its pivot point 48, a spring finger 74 will bear against such operated cam and provide positive insurance that its contact with the power roller 10 will be broken after the typing stroke. As the cam knock-out bar eccentric rotates, its oscillates the cam knock-out bar 70 about its pivots.

Fig. 4 of the drawings also shows the margin set mechanism whereby depression of a margin set key 76 operates a margin set key lever 78 for positioning margin stops during such operation. The margin set key lever 78 is connected to a link 80 which in turn is connected to a lever arm 82 pivoted on a shaft 84 for rocking motion. The upper end of the lever arm 82 is slotted to receive a stud 86 extending laterally from the face of a margin stop set finger 88. The margin stop finger 88 is pivoted to rock in a clockwise direction under the influence of the operating mechanism about a pivot 90 so that when operated the free end 92 of the margin stop set finger 88 will bear against the top edge of a margin stop 94 positioned thereunder and release such stop from the margin stop rack 96 to permit positioning thereof in respect to the rack 96.

Figure 10:
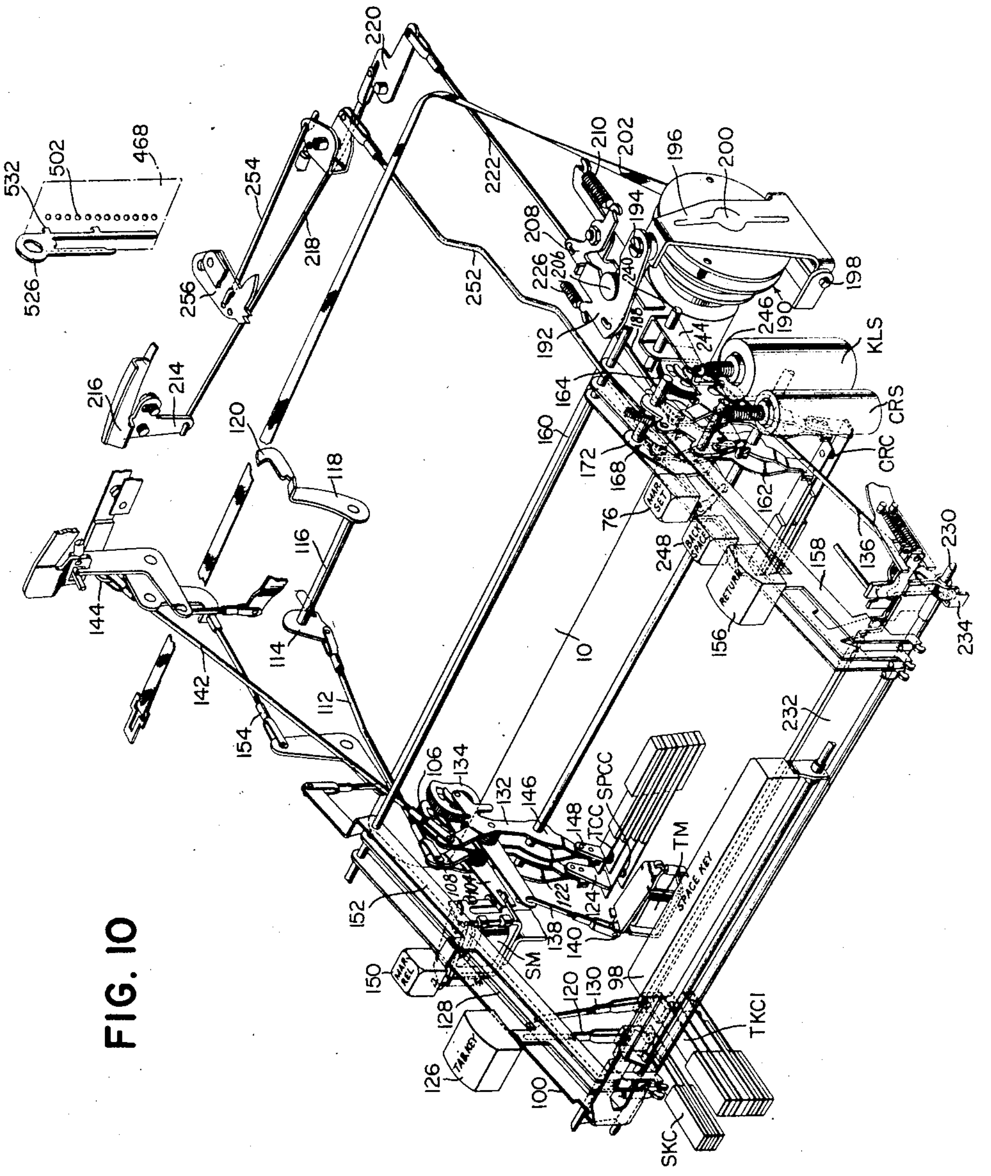
Fig. 10 is a more or less diagrammatic view of certain of the typewriter function control mechanism.

Fig. 10 of the drawings is a somewhat diagrammatic view of certain of the typewriter function keys and operating mechanism. At the lower left of that figure is shown certain tabulating control mechanism and certain space control mechanism which is presented on an enlarged scale in Fig. 11. At the lower right of Fig. 10 is shown the carriage return key, a carriage return solenoid and a keyboard lock solenoid, together with associated mechanism all of which is shown in the enlarged view of Fig. 12.

Insofar as the tabulating key mechanism, the space key mechanism, and the carriage return key mechanism are concerned, the structure as used in conventional power operated typewriters has been altered to the extent that these typewriter functions are controlled through electromagnetic operating devices rather than by direct mechanical connection. These arrangements will be more fully understood when considered in light of Figs. 10, 11 and 12.

Figure 11:
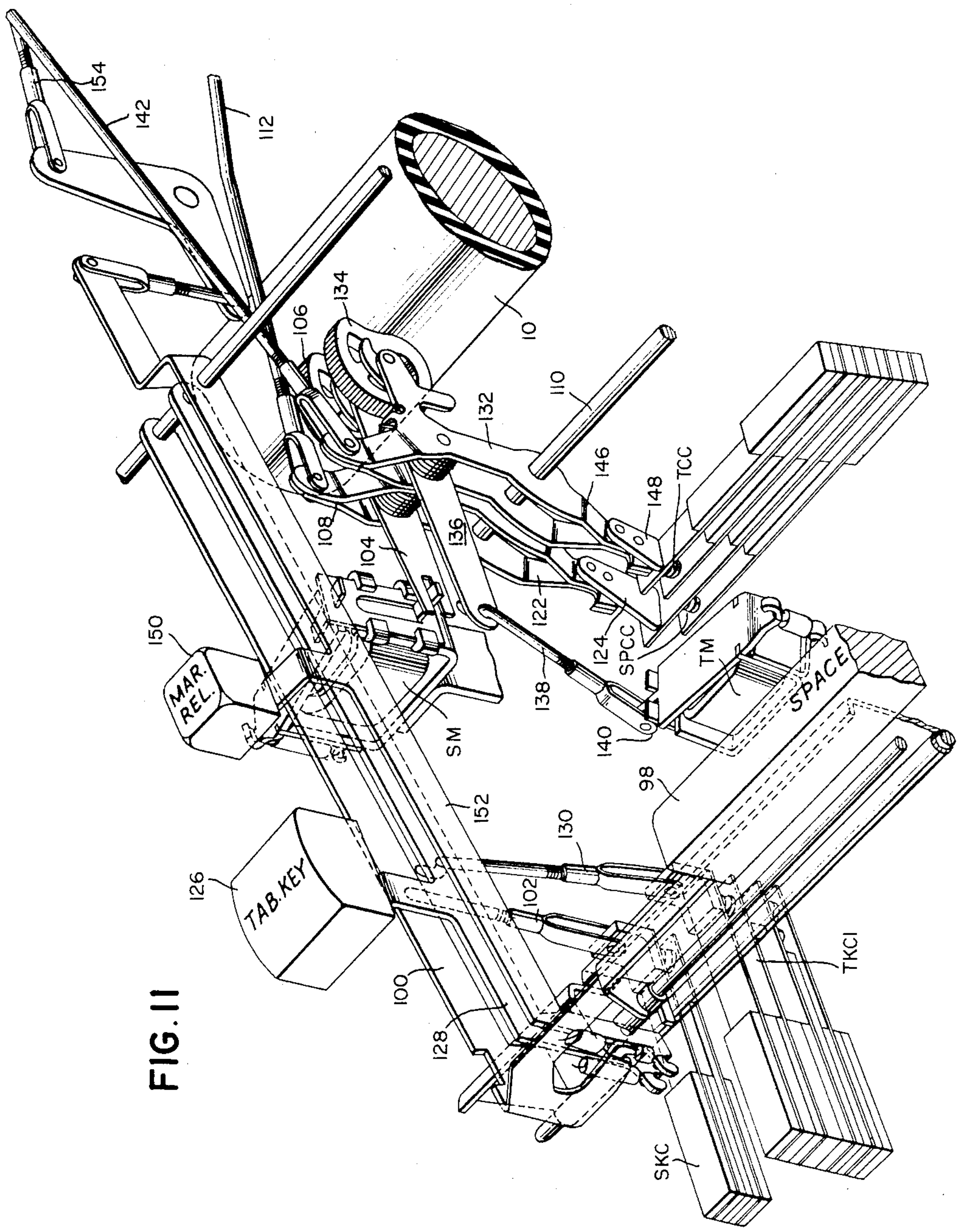
Fig. 11 is an enlarged view of the tabulating mechanism, space mechanism and margin release mechanism at the left of Fig. 10.

In Fig. 11 a space key 98 is disposed at the bottom of the conventional typewriter keyboard, and it is associated with a space key lever 100 in such manner that each depression of the space key 98 results in an operation of the space key lever 100. Herein the space key lever 100 is connected by means of a connecting link 102 to the movable blade of a space key contact SKC, whereby each space key operation results in closure of the space key contact SKC. The space key contact SKC is in the circuit of a space magnet SM which when energized will rock a trip link 104 to engage a space cam 106 with the power roller 10. The space cam 106 is of conventional structure and operation, and it suffices to say that as the cam frame 108 is rocked about its pivot 110 a space trip lever operating link 112 is drawn to the left in Figs. 10 and 11 to rock an operating plate 114 (Fig. 10) and thereby a rock shaft 116 and a lever arm 118, which, in turn, is effective to operate a trip lever 120 to cause carriage spacing through conventional control mechanism. The cam frame 108 has a portion 122 extending below the pivot rod 110 and to this downwardly extending portion of the cam frame is fixed a contact operating finger 124 which normally lies in contact with the movable blade of a normally open space cam contact SPCC. The space cam contact SPCC is in the punching circuits and punches a feed hole into the tape.

A tabulating key 126 is mounted on a tabulating key lever 128. In the conventional power operated typewriter the tabulating function is performed through mechanical linkages set into motion by depression of the tabulating key, but in the present instance depression of the tabulating key 126 is effective to close a tabulating key contact TKC1. To this end an operating link 130 extends from the tabulating key lever 128 to one blade of the tabulating key contact TKC1 whereby the tabulating key contact TKC1 is closed each time the tabulating key is depressed. In circuit with the tabulating key contact TKC1 is a tabulating magnet TM which when energized is effective to trip a power cam into contact with the power roller. By reference to Fig. 11 it will be seen that a cam frame 132 pivoted on the cam frame pivot 110 carries a tabulating cam 134 which is tripped into contact with the power roller 10 by movement of a trip link 136 under the influence of an operating link 138 extending between the trip link 136 and the free end of an armature 140 associated with the tabulating magnet TM. It follows, therefore, that each time the tabulating magnet TM is energized and its armature 140 attracted to the core thereof, the tabulating cam 134 is tripped into contact with the power roller 10 and thereby the cam frame 132 is rocked in a counterclockwise direction about the cam frame pivot 110. This movement is imparted to a tabulating actuating link 142 which extends into operative relation with a tabulating release bell crank 144 (Fig. 10), which when operated causes tabulating movement of the carriage in well known manner.

The cam frame 132 on which the tabulating cam 134 is mounted has a part 146 extending below the cam frame pivot 110 and to this extension is fixed a contact operating finger 148 which lies in contact with the movable blade of a tabulating cam contact TCC. Actuation of the tabulating key will cause the typewriter carriage to tabulate in normal fashion or to undergo a series of spacing operations which will continue until a program unit (to be described later) senses a "punch off" position, depending on the condition of certain electrical control circuits to be fully described hereinafter. At selected positions of the typewriter carriage (punch-on position), when a tabulating function is initiated, a (2) hole will be punched into the transmittal tape. Also at selected positions of the typewriter carriage, operation of the tabulating key will cause a series of spacing operations of the typewriter carriage which will continue until the "punch-off" position is reached. For each carriage position spaced, a corresponding space (feed hole) will be registered in the tape. Actuation of the tabulating key will also close the tabulating key contact TKC, energizing, as will be pointed out more fully hereinafter, certain pick-up coils of control relays.

Figs. 10 and 11 also show a margin release key which is of conventional structure and operates in a conventional manner. It is sufficient to say that when the margin release key 150 is depressed, the margin release key lever 152 is operated to push a margin release link 154 to the right in Figs. 10 and 11, thereby releasing the margin stops in a conventional fashion.

Figure 12:
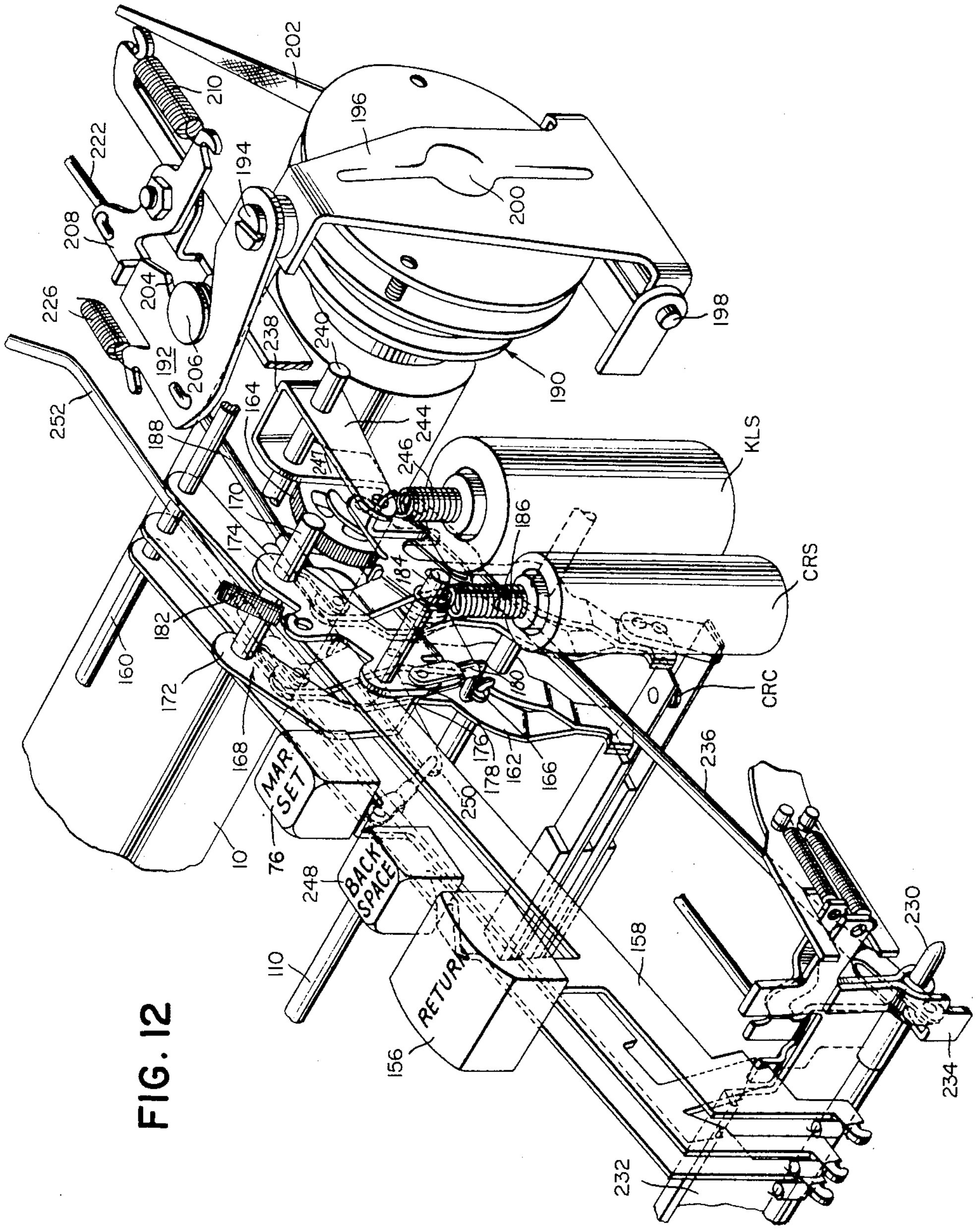
Fig. 12 is an enlarged view of the carriage return, back space, the margin set and the keyboard lock mechanism shown at the right in Fig. 10.

Fig. 12 shows the control mechanism for the carriage return function. The keyboard is provided with a carriage return key 156 carried by a carriage return key lever 158. The lever is mounted on the pivot shaft 160 so that depression of the carriage return key 156 will rock the carriage return key lever 158 downwardly about the pivot shaft 160. In the conventional structure there is a direct connection between the carriage return lever and the trip lever of the carriage return cam. However, inasmuch as it is required herein that the carriage return cam be tripped not only through manual depression of the carriage return key 156 by mechanical links but also upon energization of a carriage return solenoid CRS, the carriage return solenoid is in the circuit of the end of card key contact ECC so that upon closure of the latter, the carriage will also be returned.

A carriage return cam frame 162 is pivoted on the cam frame pivot rod 110 for rocking movement in a counterclockwise direction under the influence of the carriage return cam in contact with the power roller. The carriage return cam frame 162 carries a carriage return cam 164 which is tripped into contact with the power roller 10 upon operation of a cam trip lever 166. In order to provide for independent operation of the cam trip lever 166, either under the influence of the carriage return key 156 or the carriage return solenoid CRS, there has been provided a generally U-shaped bail 168 which is mounted for rocking movement about a shaft 170 which passes through the extremities of the parallel legs 172 and 174 of the U-shaped bail 168. The bottom or bail surface 176 of the bail structure 168 lies directly under the carriage return key lever 158 so that downward movement of the carriage return lever is mechanically imparted to the bail structure 168 to cause the same to rock about its pivot shaft 170 in counterclockwise direction.

The leg 174 of the bail structure has an extension 178 which is linked to the cam trip lever 166 by means of a connecting member 180. Thus when depression of the carriage return lever 158 causes the bail member 168 to rock in a clockwise direction about its pivot shaft 170, the trip lever 166 of the carriage return cam 164 is operated to release the carriage return cam into contact with the power roller 10. A spring 182 returns the bail member 168 to its normal position and holds it against the bottom edge of the carriage return key lever 158.

In order to permit the tripping of the carriage return trip cam lever 166 under the influence of the carriage return solenoid CRS, a pin 184 extends laterally from the extension 178 of the bail leg 174. Attached to the pin 184 is a spring 186 which interconnects the pin 184 and the core of the carriage return solenoid CRS. The spring being a resilient, flexible connection permits operation of the trip lever actuating bail 168 without interference from the carriage return solenoid CRS, and by the same token permits operation of the bail 168 by the carriage return solenoid CRS without interference with the mechanical actuating mechanism through the carriage return key lever 158.

When the carriage return cam frame 162 is rocked about its pivot rod 110 in a counterclockwise direction upon release of the carriage return cam 164, either through depression of the carriage return key 156 or through energization of the carriage return solenoid CRS, the motion is transmitted through an operating link 188 which controls the operation of a carriage return clutch 190. The carriage return clutch is in its essential aspects like the clutch shown in the Hollis Patent No. 2,104,559, but has a modified control linkage as follows. The clutch operating link 188 is attached to a cam plate 192 pivoted by means of a pivot stud 194 on the upper end of a cam operating plate 196. The cam operating plate 196 is mounted for rocking motion on a fixed shaft 198, and its central portion 200 is adapted to press against a clutch operating plate in such fashion that when pressure is applied the normally disengaged clutch discs are brought into driving contact with each other to wind in a carriage return tape 202 which has its free end attached to the carriage in well known manner.

The cam plate 192 has a face 204 which bears against a fixed stud 206 which is effective to cam the plate 192 inwardly when drawn forward under the influence of the operating link 188. This inward movement of the cam plate 192 is transmitted through the pivot stud 194 to the cam operating plate 196, thereby applying pressure to the underlying clutch operating plate to bring the friction faces of the clutch into contact with each other. During return of the carriage, a cam disc follower 208 is held against an edge of the cam plate 192 by means of a spring 210 which interconnects one end of the follower lever 208 with a fixed frame member 212.

As in a conventional carriage return mechanism, with particular reference to Fig. 10, there is a return clutch release lever 214 which is rocked in a counterclockwise direction when the marginal stop of the carriage engages a member 216 upon attaining its return position. Rocking motion of the return clutch release lever 214 is transmitted through a link 218, a pivot plate 220 and a carriage return clutch knock-out link 222. The carriage return clutch knock-out link 222 is attached to the cam follower plate 208 so that the rearward movement thereof upon carriage return is transmitted to the plate 208, thereby rocking the plate about a pivot 224 against the tension of the spring 210, thereby permitting a cam plate spring 226 to return the cam plate 192 to its original or inoperative position. This releases the carriage return clutch discs.

The carriage return solenoid CRS is in the circuit of an end of card key contact ECC so that closure of the end of card contact ECC will energize the solenoid CRS as will be more fully explained hereinafter.

The well known automatic electric typewriter has a power switch 228 (Fig. 5) which not only controls the flow of current to the motor but also has connection with a shaft 230 (see Fig. 4) disposed transversely at the front of the keyboard. The shaft 230 is mounted for rocking movement in bearings at its ends and has attached thereto an upstanding keyboard lock comb 232, the upper edge of which extends into contact with the bottom edge of the key levers to lock such levers against movement when the comb is in latching position. The structure is such that whenever the power switch 228 is turned to its off position, the keyboard lock comb 232 is rocked into contact with the bottom edge of the key levers to latch them against operation at such time.

The structure herein has been modified to the extent that the keyboard locking comb 232 may also be rocked into keyboard locking position upon energization of a keyboard lock solenoid KLS. The specific structure by which this secondary locking function is achieved is best shown in Fig. 12 of the drawings. The shaft 230 has affixed thereto an arm 234 with which is connected an operating link 236. The operating link 236 in turn is connected with a member 238 which is mounted for rocking movement on a shaft 240. The member 238 includes a downwardly projecting arm 247 to which the operating link 236 is pivoted. The member 238 also includes a forwardly projecting arm 244 which is connected to the core of the key lock solenoid KLS by means of a spring 246.

Whenever the key lock solenoid KLS is energized, by operation of the card error key CEK with the resulting energization of the key lock solenoid KLS, as will be more fully described hereinafter, reciprocation of its core will rock the member 238 in a counterclockwise direction about the pivot shaft 240, thereby projecting the downwardly extending arm 242 of the member 238 rearwardly to pull the operating link 236 rearwardly, thereby turning the keyboard lock comb 232 into locking position.

Fig. 12 of the drawings also shows a back space key 248 which is adapted to trip a back space cam unit through its trip lever 250. The arrangement of the back space cam is conventional and need not be described in detail. It is sufficient to say that operation of the back space cam by contact with the power roller 10 will pull forwardly on a back space operating link 252 to impart back spacing movement to a back space link 254 (Fig. 10) and a back space pawl 256 in well known manner.

Figure 13:
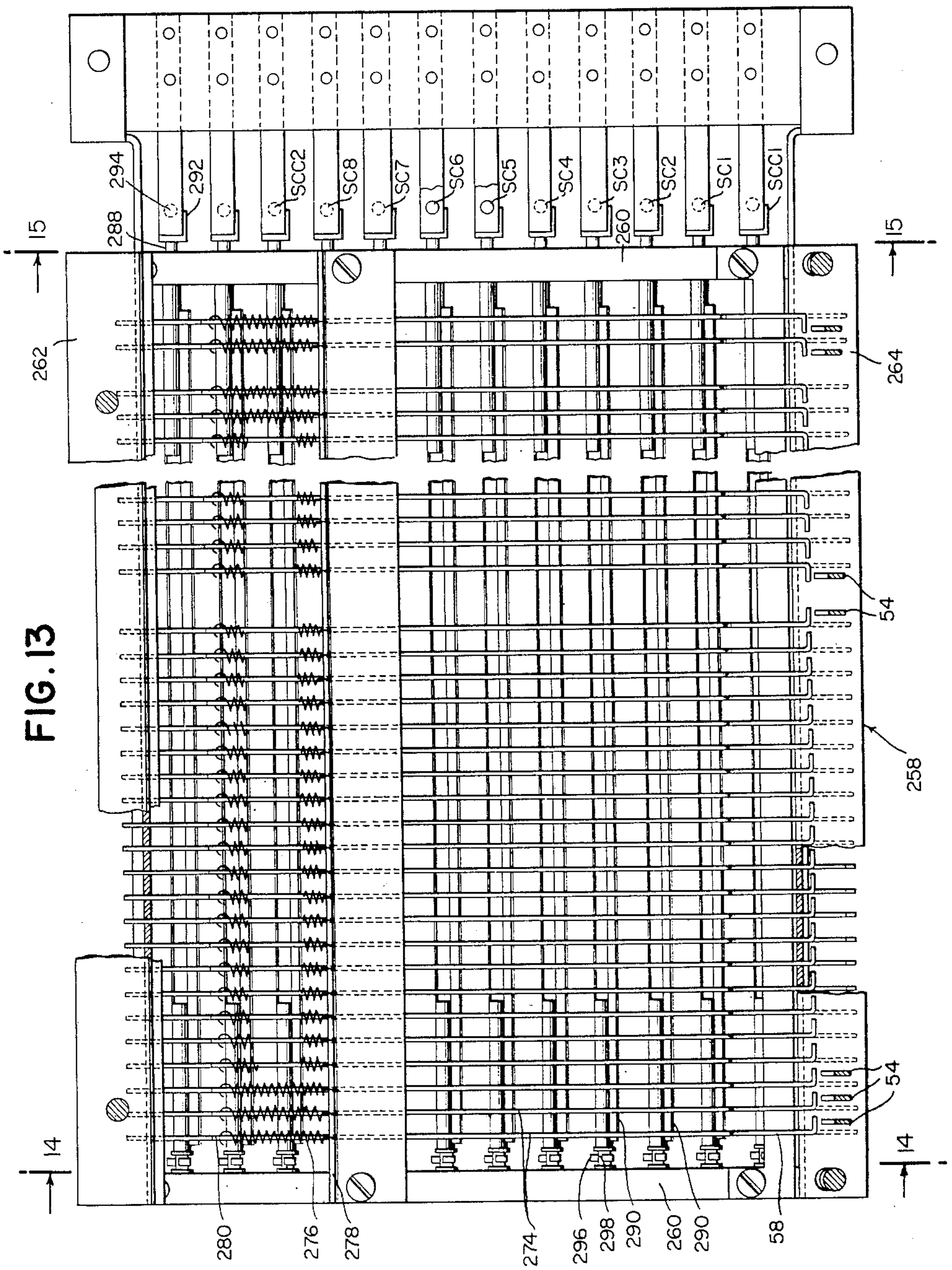
Fig. 13 is a plan view of certain selector mechanism used in the modified typewriter unit.
Figure 14:
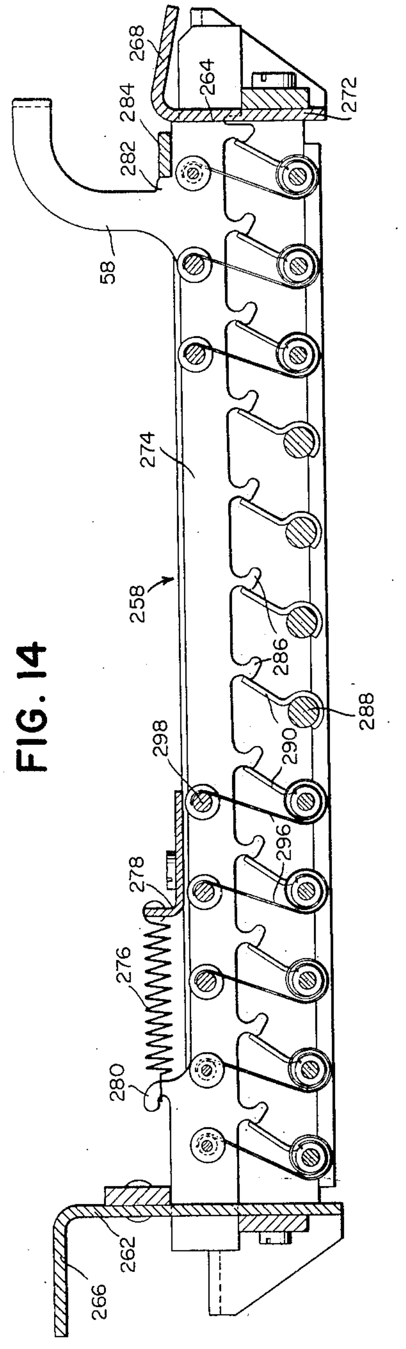
Fig. 14 is a sectional view on line 14—14 of Fig. 13.
Figure 15:
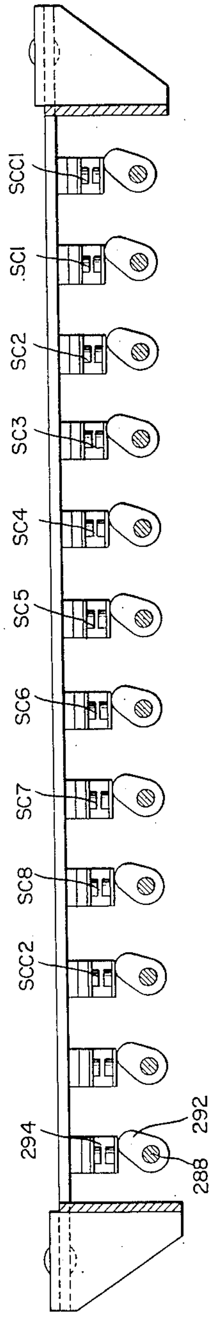
Fig. 15 is a cross-sectional view on the line 15—15 of Fig. 13.

Since it is contemplated that the characters be coded for punching into the tape during the writing of a document, such as a business form, there has been provided herein means under control of the typewriter cam units for this purpose. Allusion has been made to such an arrangement heretofore by reference to a selector means. A code selector 258 in its relation to the typewriter mechanism is shown in Fig. 4 and the details thereof are illustrated in Figs. 13, 14 and 15. The selector unit provides a means for coding most of the typewriter key lever cams to punch various subcombinations of a seven hole code into the tape.

All of the alphabetical and numerical keys will operate the selector unit for this purpose. Operation of the "&" key will cause the punching of a (1) hole into the tape, the asterisk (*) key will operate to punch a (2) hole into the tape, and operation of the oblique (/) key will cause the mechanism to punch the 3, 4, 5 and 6 holes into the tape. The cancel key will print a diagonal, but will not punch the tape. The remaining special character keys do not punch the tape except when auto spacing circuits are effective, in which case they space the tape as to be explained hereinbelow. The carriage return key does not punch the tape, and the tabulating key has several functions as will be explained hereinafter in connection with the auto space circuits.

The code used for punching the tape in relation to the index points of the conventional Hollerith tabulating card is as follows:

| Card code: | Tape code |
|---|---|
| 12 | 1 |
| 11 | 2 |
| 0 | 3 |
| 1 | 4, 5, 6 |
| 2 | 4, 5 |
| 3 | 4 |
| 4 | 5 |
| 5 | 4, 7 |
| 6 | 5, 7 |
| 7 | 7 |
| 8 | 6 |
| 9 | 5, 6, 7 |
| Space | Blank |

The selector mechanism 258 comprises a plurality of selector slides and contact operating bails carried in a frame attached to the bottom of the typewriter as shown in Fig. 4. The frame consists of a pair of parallel side members 260 connected in a rigid structure by means of a transverse rear angular frame 262 and a transverse angular front frame 264. The rear frame 262 has a generally horizontal flange 266 and the front frame 264 has a generally horizontal flange 268. The flanges 266 and 268 provide means whereby the selector units is attached to the typewriter structure.

The flange 270 of the rear frame 262 and the vertical flange 272 of the front frame 264 are slotted to provide guide combs for a plurality of selector slides 274. Each selector slide has an upstanding finger 58 (as noted before) adapted to be rocked by the flange 64 of the sleeve 62 as heretofore described. The selector slides 274 are maintained in a forwardly disposed position as shown in Fig. 14 by means of a spring 276 disposed between a spring bracket 278 and a spring lug 280 extending upwardly from the slide. Tension of the spring 276 is sufficient to keep a shoulder 282 on each slide in contact with a stop bar 284 disposed at the forward end of the frame.

It will be understood that one such selector slide 274 is provided for the cam assembly of each numeral, letter and character of the typewriter that is to be punched into the tape. The structure of each selector slide and its operation by an associated cam assembly is identical so that a description of one will suffice as a description of six.

Depending from the lower edge of each slide are a plurality of fingers 286, one such finger being provided for each selector unit bail in the assembly. Herein there has been shown twelve selector unit bails 288, although in the specific example illustrated by this specification only ten of the bails are used. The depending fingers 286 of the selector slides are readily broken off so that the slides may be coded by using only that number of fingers 286, and in those positions necessary to effect closure of the punch circuits representative of a number or character in the code employed. The selector unit bails 288 are pivotally mounted and each has atached thereto a radial flange 290 extending along the major portion of the length thereof and into the operative zone of the depending fingers 286. It will be seen, therefore, that when a selector slide 274 is reciprocated to the left in Fig. 14, a finger 286 will rock an associated flange 290 and its selector unit bail 288 in a counterclockwise direction.

By reference to Figs. 13 and 15 it will be noted that each of the selector unit bails has a cam-like operating finger 292 attached to one end thereof. Reference to Fig. 15 will show the relationship between the operating finger 292 and a plurality of associated contacts. Herein it will be seen that each of the cam-like operating fingers 292 has associated therewith a normally open contact 294 which is closed by the rocking movement of a selector unit bail and its associated contact closing finger 292. The contacts 294 are in the punch circuits as will appear more fully hereinafter, and thereby control the operation of the several tape punch elements for punching into the tape the holes called for by the closure of the respective contacts 294.

In Fig. 15 of the drawings there is shown the selector common contact SCC1 which is closed each time any one of the selector slides 274 is reciprocated. From this it may be inferred that the depending finger 286 at the forwardly disposed end of each of the selector slides is permitted to remain intact to insure closure of the selector common contact SCC1 whenever any one of the slides is operated.

By further reference to Fig. 15 of the drawings it will be seen that there are provided seven additional selector contacts SC1, SC2, SC3, SC4, SC5, SC6 and SC7 which control operation of punch magnets for punching the 1 to 7 code holes, respectively, into the tape. Whenever a special character is printed (when the auto-spacing feature is in operation), selector unit contact SC8 controls the spacing of the tape. Selector bail contact SCC2 provides a common bail for the SC8 contact in connection with the auto-spacing operation.

After a selector slide has been reciprocated to cause closure of one or more of the selector contacts and following release of the flange 56 (Fig. 4) and return of the selector slide 274 under influence of the spring 276, return movement of the selector unit bails is under the influence of a spring 296 which is wrapped around the selector unit bail, having one end attached thereto and the other end to a spring stud 298 extending from the side frame 260 as seen at the left of Fig. 13.

Figure 21:
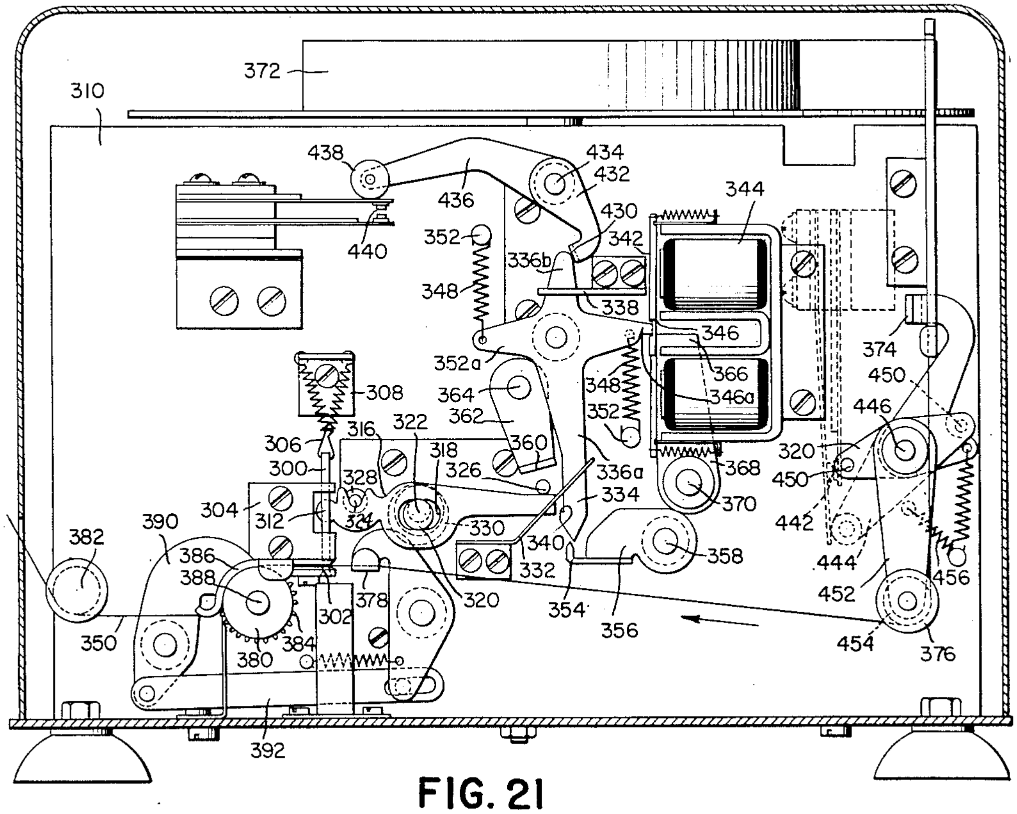
Fig. 21 is an elevational view of the tape perforating unit.
Figure 22:
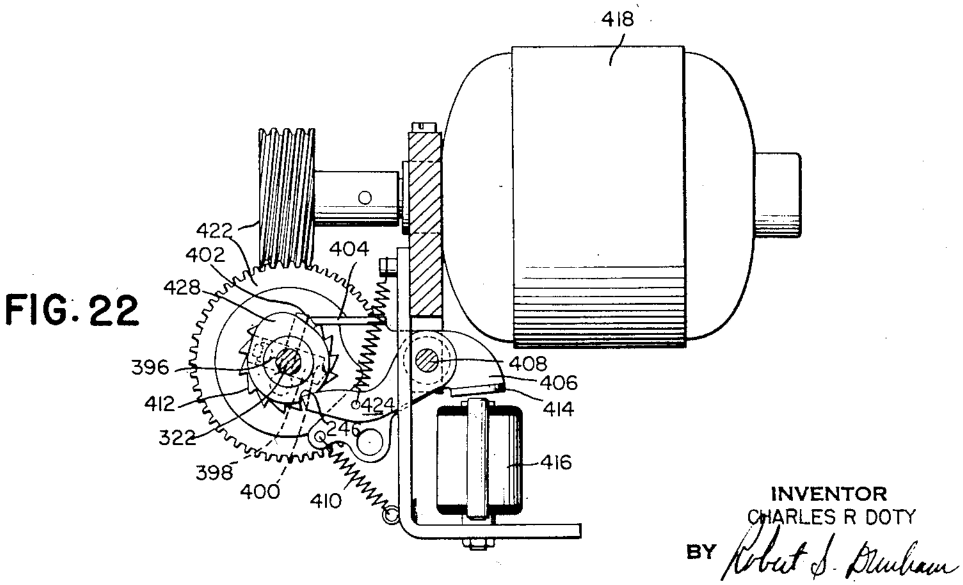
Fig. 22 is a view of the tape perforating unit motor and associated start-stop clutch control means.

Referring now to Figs. 21 and 22 the perforating apparatus is shown to include individual punch elements 300, one for each unit of the code, and a common die block 302. The punch elements are slidably arranged in individual openings in a common punch guide block 304, and are normally held in retracted positions by means of individual springs 306. The springs 306 are supported by a bracket 308 which is suitably secured to a pair of spaced, parallel, upright side plates 310 (only one shown). The punch guide and die blocks are also suitably secured to the plates 310. Each punch element 300 is provided with a recess 312 into which recess is placed one end of a positionable punch lever 316 having an oval shaped opening 318. An individual punch lever is provided for each punch element. An elongated cam or eccentric 320 is carried by or, if desired, formed on shaft 322, which shaft is suitably journaled in the side plates 310. The eccentric 320 is disposed within the oval-shaped openings of the individual punch levers to support and actuate or oscillate the levers. Suitably disposed stop guides or rods 324 and 326 are provided to maintain proper alignment of the punch levers.

In order to space the punch levers properly, suitable loose fitting spacing washers 328 and 330 are provided on rod 324 and eccentric 320, respectively, and disposed between each punch lever 316, as shown in Fig. 21. In addition thereto, the free ends of the individual punch levers extend into correspondingly spaced, individual slots formed in a guide comb 332 suitably secured to plate 310. Normally, during the rotation of the eccentric, the punch levers are moved downwardly and upwardly (as viewed in Fig. 21) about the pivoted connections formed by the ends of the punch levers engaging the recesses of the related punch elements. Under these conditions, it is seen that the free ends of the punch levers are partially rotated first in one direction and then in the reverse direction, or, stated in other words, the said free ends of the punch levers are oscillated.

Individual, suitably spaced latch members or levers 334 are provided, one for each punch lever, said latch levers being pivotally supported by a stud shaft 336 and having the depending arms 336*a* and upright arms 336*b* loosely fitted into individual slots in guide combs 332 and 338, respectively, the latter also being suitably secured to plates 330. Near the extremity of each arm 336*a*, a latching shoulder 340 is provided, which shoulders are disposed in close proximity to, but normally held out of the paths of, the oscillating ends of the punch levers, by means of the individual and related latching armatures 342 of magnets 344. Each armature 342 is provided with a shouldered recess 346 and, when released, engages the tip of arm 346*a* of the related latch lever 334 to latch the latter and hold the arm 336*a* out of the path of the free end of the related punch lever.

Upon momentary energization of magnet 344, the related armature 342 is attracted to trip or release the engaged arm 346*a* and permit the related latch lever 334 to swing in a clockwise direction, under influence of spring 348, thereby positioning the shoulder 340 of arm 336*a* in the path of the free end of the related punch lever 316.

It should be mentioned at this time that, in the present embodiment, the shaft 322 carrying the eccentric 320 is not constantly rotated, but operated in a start-stop manner, and that the latch levers 334 are arranged to be positioned to latch the desired punch levers before the rotated eccentric displaces or oscillates the said punch levers. Thus, upon latching of a punch lever 316 and rotation of the eccentric 320, the said punch lever is positioned by the eccentric about the pivotal connection formed by the arm 336*a* of the latch lever 334 and the latched end of the punch lever, to force the related punch element 300 downwardly, thereby causing the sheet, such as a tape 350, interposed between the said guide and die blocks to be perforated.

It should also be mentioned that individual springs 348 having the one end thereof secured to posts 352 are attached to arms 352*a* and 346*a* of alternate latch levers 334 for normally urging the related latch levers in a clockwise direction. Due to the close spacing of the latch levers, the springs are alternately arranged as mentioned. For this reason, only the alternate latch levers 334 need be provided with arms 352*a*. The related armatures 342 and magnets 344 are also placed in staggered positions, in order to provide an extremely compact arrangement of the magnets and latch levers.

Locking means are provided for holding the displaced latch lever or levers in a latched position, and for preventing displacement of undesired latch levers during the rotation of the eccentric. This means comprises a locking bail 354, which is common to all latch levers 334, and which is suitably secured to an arm 356, which arm 356 in turn is fixed to a shaft 358. Upon displacement of the desired latch levers in the said latching position and upon rotation of shaft 322, a cam (not shown) allows the locking bail 354 to be raised in the path of the said arms 336*a*, thereby engaging the extremities of arms 336*a* of the displaced latch levers and locking them in the latching position. This position of the said locking bail also prevents any faulty displacement of the normally positioned latch levers, since the bail is now effective to engage the extremity of arm 336*a* of any latch lever which inadvertently might be displaced during the rotation of shaft 322, thereby blocking further clockwise rotation of these latch levers and preventing engagement of the latching shoulders 340 and the latching ends of the related punch levers 316. The said raised position of locking bail 354 is maintained until the sheet or tape 350 is perforated, when the cam (not shown) lowers the said bail. Obviously, the bail must be lowered before the latch levers 334 are positively restored by the action of a reset bail 360.

The bail 360 is secured to arm 362, which arm in turn is fixed to shaft 364 journaled in the said plates 310, which shaft has affixed thereto a spring urged cam follower arm (not shown) cooperating with a related cam secured to shaft 322. Said cam is effective, during each cycle of rotation of shaft 322 to partially rotate the follower arm and shaft 364 in a counterclockwise direction to cause the bail 360 to positively urge and restore the latch levers 334 to the normal latched position out of the path of the latching ends of the related punch levers 316. Upon release of the latched punch levers 316, the punch elements are withdrawn immediately from the perforated tape under influence of the related springs 306. For this condition, the punch levers are positioned about the eccentric 320 as a pivot. It is evident from the description to follow, if it is desired to withdraw the punch elements positively from the tape under influence of the eccentric, it is merely necessary to prolong the period during which the punch levers are held in latched positions by levers 334 and delay the period in the cycle during which the bails 360 are operated for resetting and latching the said levers 334.

Reset means are also provided for positively restoring the attracted armatures 342 of magnets 344 to the inoperative positions at the time bail 360 is operated for resetting the latch levers 334. This means comprises a bail 366 which is arranged common to the free ends of armatures 342 and is secured to or formed as an integral part of an arm 368 secured to shaft 370, the latter being suitably journaled in plate 310. Shaft 370 has affixed thereto a spring-urged cam follower arm (not shown) cooperating with a related cam (not shown) secured to shaft 322. This cam is effective to urge the said bail 366 in a counterclockwise direction to move positively any of the displaced armatures 342 to the normal position, in order to engage and latch the released arms 352*a* of the latch levers 334.

Suitable means for intermittently advancing the tape 350 are provided, which means in the present arrangement are operated near the end of each cycle of rotation of the said shaft 322. The tape 350 is fed, step-by-step, from a suitable supply 372, under a pivoted tape lever 374, over hinged roller 376 and tape guide member 378, between the separated blocks 302 and 304, over a sprocket wheel 380, and under a guide post 382 to a take-up reel. Said sprocket wheel 380 is provided with centrally located and equally spaced teeth 384 for engaging centrally located feed perforations in the tape 350. The usual positionable arcuately shaped and slotted tape finger guide 386 is provided to press the tape against the said sprocket wheel. Sprocket wheel 380 is fixed to shaft 388 journaled in plates 310. Shaft 388 has secured thereto a ratchet wheel (not shown), which is advanced step-by-step by a spring-urged cooperating pawl (not shown).

In order to facilitate tape insertion and removal operations, the tape finger guide 386 is secured to an arm 390 pivotally mounted on plate 310, which arm is pivotally connected to one end of link 392, the other end of which is connected by a pin and slot connection to the pivotally mounted and spring-urged tape guide member 378. Thus, whenever the guide 386 is raised manually, the guide member 394 is also partially rotated in a counterclockwise direction so that the tape becomes easily accessible on both sides of the punch station.

From the description up to this point, it is understood that, at the start of each cycle of rotation of shaft 322, the latch levers 334 are released and positioned in any desired combination, upon energization of the related magnets 344, so as to be partially rotated in a clockwise direction in order to latch the free ends of the related punch levers 316. Next, the locking bail 354 is operated to engage and lock the displaced latch levers 334 in a latched position, during part of the cycle, and to prevent further latching operations by the remaining latch lever or levers during this cycle.

Eccentric 320 is then effective to oscillate the latched punch levers 316 causing the connected punch elements 300 to be operated to perforate the tape 350, in accordance with the selected combination of operated punches, while the said tape is at rest at the punching station. After the punching operation, the locking bail 354 is restored to its normal position, and the reset bails 360 and 366 are rendered operative to restore the latch levers 334 and armatures 342, respectively, to their normal positions, thereby releasing the latching ends of the related punch levers and permitting the punch elements to be withdrawn from the tape. The tape feeding mechanism is then rendered operative, near the end of the cycle, to advance the tape one step, thus presenting the next punching position on the tape to the said punch elements.

In order to control the start-stop operations of shaft 322, a well known type of electromagnetically controlled, one-revolution clutch means is provided. For a detailed description of a similar clutch mechanism, reference should be made to U. S. Patent No. 2,206,646, issued to K. R. Schneider on July 2, 1940. Accordingly, the brief description to be given is deemed sufficient for complete comprehension of the present invention. In Fig. 22 this clutch means is shown to comprise an annular member 396 which is secured to shaft 322. A slidable and spring-urged dog member 398 is disposed in a suitable channel formed in the said annular member, which dog member is provided with a single tooth 400. A dog lift lever 402 is pivotally mounted in the annular member 396 and is disposed in a suitable channel-way formed in the slidable dog member 398. The free end of the said dog lift lever extends beyond the periphery of the annular member 396 and normally is positioned against a stop 404 formed on the suitably pivoted lever 406 secured to stud shaft 408, which lever normally is urged by spring 410 so that the said stop 404 is in the path of the dog lift lever 402. With the described elements of the clutch means in this position, the dog lift lever 402 is effective to hold the dog member 398 so that the single tooth formed thereon is out of the path of a ratchet wheel 412 secured to a constantly rotated power shaft and disposed in close proximity to the annular member 396.

Secured to the said pivoted lever 406 is an armature 414 of an associated and suitably disposed magnet 416, which armature upon momentary energization of magnet 416 positions the stop 404 of lever 406 out of the path of the dog lift lever 402, thereby releasing the latter and permitting the dog member 398 to be positioned so that its tooth 400 engages the ratchet wheel 412.

The power shaft is constantly rotated by means of motor 418, the shaft of which is connected to a shaft 420 by a suitable worm and worm wheel drive 422. In this manner shaft 322 is rotated. Upon completion of a cycle of rotation of shaft 322, the dog lift lever 402 is urged against the said stop 404 to disconnect the tooth 400 of the dog member from the constantly rotated ratchet wheel 412, thus preventing further rotation of this shaft.

Suitable locking means are provided for this described clutch, and comprise a suitably disposed, spring-urged arm 424 (secured to stud shaft 408) cooperating with a suitable notch 426 formed in a cam 428, the latter being fixed to shaft 322. The high point of cam 428 cooperating with arm 424 serves as a positive resetting device for stop 404 and armature 414.

With reference again to Fig. 21, a pivoted bail 430 is provided which is common to the arms 336*b* of latch levers 334 and supported by arms 432 mounted on a shaft 434. One of the said arms 432 is provided with an extension arm 436 and roller 438 so that, upon the displacement or release of any latch lever 334, the described bail assembly is partially rotated in a counterclockwise direction to close the suitably disposed contacts 440. Thus, it will appear from detailed circuit description to follow that the clutch control magnet 416 is energized any time the punch magnets 344 are energized to release the said latch levers 334, for effecting rotation of shaft 322.

Additional controlling contacts can be provided, if desired, for example, the suitably disposed tape controlled contacts 442 secured to upright plate 310. These contacts are controlled both upon the exhaustion of the tape supply to the punch station, and by excessive tension in the tape supply. A contact operating arm 444 is secured to a shaft 446 journaled in plate 310, which arm is constantly urged in a counterclockwise direction by the elongated spring blade of contacts 442. Also secured to shaft 446 is a dog member 448 having oppositely directed pins 450 fastened thereto. The spring-urged tape lever 374 is pivotally mounted on shaft 446 and rides on the tape 350, thus preventing engagement of the lever and one of the pins 450. However, upon exhaustion of the tape, the lever 374 is rotated sufficiently in a clockwise direction to engage and partially rotate the dog member and operating arm 444 to open the contacts 442. A tape tension arm 452 having a roller 454 is also rotatably mounted on shaft 446, which arm 452 is urged in a counterclockwise direction by springs 456. In the event the tape supply to the punch station becomes too taut, the tape 350 is effective to cause the arm 452 to be partially rotated in a clockwise direction to engage the other pin 450 on the dog member 448, to rotate the latter and operating arm 444 to open the said contacts 442. These contacts can be connected in the circuit to the clutch control magnet 416, so that this magnet cannot be energized whenever the tape becomes too taut or the supply thereof exhausted.

A plurality of cams CB1 through CB6 associated for operation of cam contacts CBC1 through CBC6, respectively, (Figs. 29*b*, 29*c* and 29*d*) are mounted on the shaft 322 for rotation therewith. The cams CB1 through CB6 are arranged to close their related contacts of the group CBC1 through CBC6 as shown in the timing diagram of Fig. 31. Further details of the punch mechanism may be obtained by reference to Patent No. 2,346,267 granted April 11, 1944, to A. W. Mills et al. wherein Figs. 2 and 5 correspond, respectively, to Figs. 21 and 22 herein.

The "punch on" and "punch off" condition and consequently the selectivity of the punch during the typing of documents is controlled by a program control assembly which is operated by carriage movement.

Figure 16:
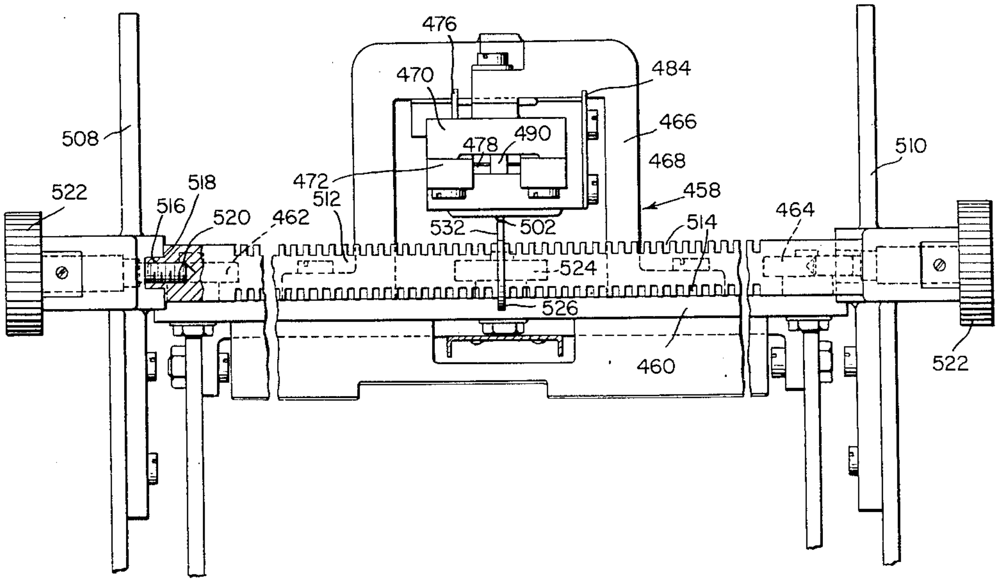
Fig. 16 is a plan view of a program control insert bar mounted on the carriage of the modified typewriter unit and an associated contact unit.

Reference to Fig. 16 of the drawings will show a program control assembly 458 at the rear of the typewriter structure. A reinforcing plate 460 (Fig. 4) is attached to the rear face of the typewriter and carried by this plate are a pair of guide rollers 462 and 464. These guide rollers are provided for cooperation with and support of a program control insert bar as will appear at a later point herein. Attached to the plate 460 is a bracket 466 which is generally U-shaped and provides support for a ball contact unit 468. The ball contact unit 468 as shown diagrammatically in Fig. 10 has twelve vertically aligned, depressible balls 502 each of which is adapted to close a related contact point when depressed. The mechanism, as presently constituted, utilizes only eight of the contacts shown, reserving four for added capacity as may be required.

Figures 17, 18:
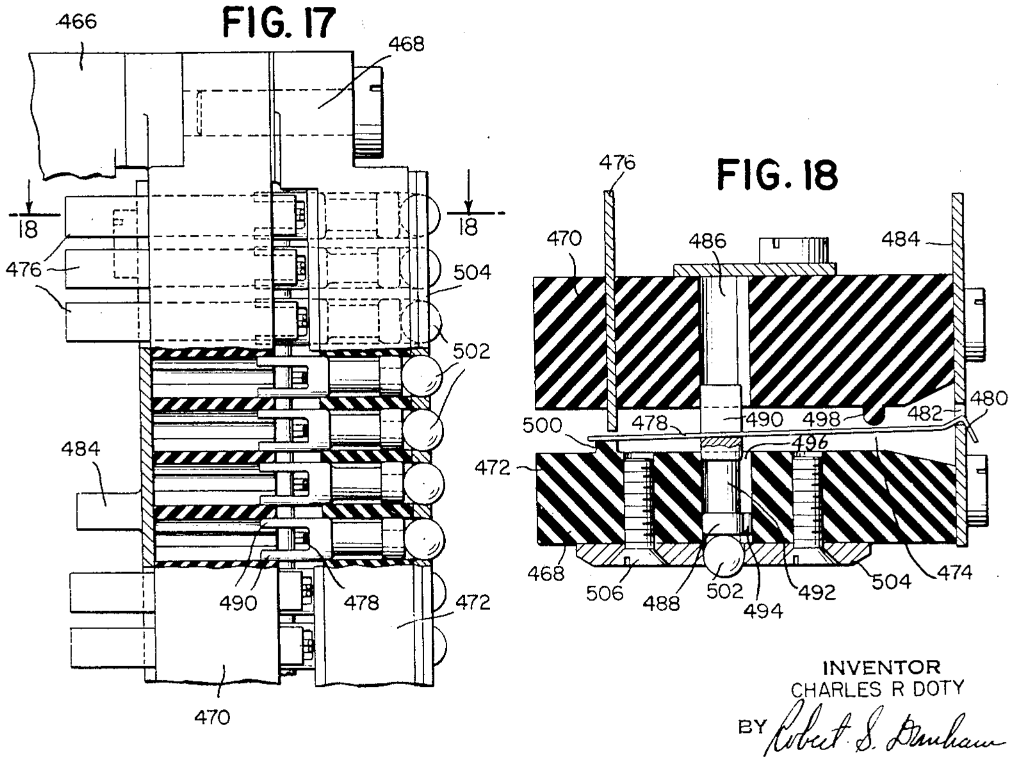
Fig. 17 is an enlarged view of the contact mechanism shown in Fig. 16.
Fig. 18 is a cross-sectional view on line 18—18 of Fig. 17.

Figs. 17 and 18 show the detail structure of the program ball operated contact unit 468. The unit consists of a pair of blocks 470 and 472 constituting a base block and a face block, respectively, each composed of suitable insulating material. The two blocks 470 and 472 are suitably spaced and have formed therein suitable cavities for the reception of certain contact elements and operating mechanism therefor. The confronting faces of the base block 470 and face block 472 are spaced throughout the major portion of their lengths to provide therein a cavity 474 into which the free end of related contact members extend in proximity to provide a series of normally open contacts. The base block 470 has a plurality of conductor strips 476 embodied therein. These strips are mutually spaced and arranged in alignment to form one side of the ball operated contacts. One end of each of these strips extends rearwardly from the base block 470 to provide a connection for conductors. The opposite end of each of the strips 476 extends forwardly from the inner face of the base block 470 and into the cavity 474 between the two blocks. The movable element of each ball operated contact comprises two conductor wires 478 which have their free ends in alignment with the free end of the fixed conductor strip 476, and have oppositely disposed ends 480 hooked over a recess 482 in a common conductor plate 484 disposed at and attached to one of the lateral edges of the blocks 470 and 472.

A series of aligned passages 486 are formed in the blocks 470 and 472 for the reception of an operating member 488, there being a passage 486 intersecting the transverse plane of each contact wire 478. Thus there is provision for an operating member for each of the program ball operated contacts.

The operating members 488 have bifurcated inner ends that provide oppositely disposed legs 490 which are adapted to straddle the related contact wires 478. The forwardly disposed neck 492 of each operating member 488 is adapted to reciprocate in the passage of the face plate 472 while the rearwardly disposed spaced legs 490 of the operating member extend into the transverse passage of the base plate 470. It will be seen, therefore, that when an operating member 488 is pushed rearwardly, its related movable contacts 478 will be forced against the forwardly extending end of the associated fixed contact strip 476. Turning movement of the operating members 488 may be prevented by forming thereon a key 494 which is adapted to engage the walls of a keyway 496 in the transverse passage of the face plate 472.

Free rearward movement of the movable contact wires 478 is prevented by a ridge 498 formed on the inner face of the base block 470 and the free end of the movable contact wires 478 is adapted to rest on a ridge 500 formed on the inner face of the face block 472. It will be observed by reference to Fig. 18 that rearward movement of the movable contact wires 478 into abutting relation with the stop rib 498 will result in the flexing of the movable contact wires 478 upon continued movement of the operating member 488. This flexing action is sufficient to project the associated operating member 488 forwardly when freed to move in that direction and will provide for a normally open condition of the program ball operated contacts.

In order to adapt the program ball operated contacts to automatic operation by a typewriter carriage carried element during operation of the typewriters, there has been associated with each operating member 488 an operating ball 502. The operating balls 502 are maintained in contact with the forwardly projecting neck 492 of the operating members 488 by means of a retaining plate 504 attached to the forwardly disposed face of the face plate 472 by means of screws 506. The plate 504 is apertured to expose a surface of the operating balls 502, the aperture in the plate being chamfered to provide for their positive retention.

The typewriter carriage has fixed thereto a pair of rearwardly extending arms 508 and 510 which are designed to support between them a program control insert bar 512. The program control insert bar 512 is similar to a conventional tabulating rack in that opposite faces thereof have formed therein a plurality of grooves 514 corresponding to the letter space positions of the carriage. The grooves are adapted to receive program tab inserts somewhat in the manner that conventional tabulating racks receive tabulating stops. Each end of the program control insert bar 512 has a tongue 516 adapted to enter corresponding grooves 518 formed in the rearwardly extending arms 508 and 510. The upper end of each of the grooves 518 is traversed by a pin 520 controlled by a knob 522. The pins 520 are adapted to enter corresponding recesses in the ends of the program control insert bar 512. By this arrangement the program control insert bar may be accurately positioned between the rearwardly extending arms 508 and 510.

Heretofore the guide rollers 462 and 464 at opposite ends of the plate 460 have been mentioned. It is appropriate at this point to note that the lower edge of the program control insert bar 512 is adapted to ride in contact with said rollers and a third roller 524 located midway between the rollers 462 and 464. These guide rollers insure that the program control insert bar maintains a fixed position as it is carried along by the carriage during operation of the typewriter.

In order that the program ball operated contacts may be closed in certain predetermined combinations, there is provided herein a plurality of program tab inserts 526. By reference to Fig. 20 it will be seen that the tabs 526 comprise a bifurcated structure having a forwardly disposed leg 528 and a rearwardly disposed leg 530. The legs 528 and 530 are adapted to slide within the face grooves 514 of the program control insert bar 512 and embrace the bar with sufficient frictional force to hold the tabs in position. When a tab has been positioned on the program control insert bar 512 the forwardly disposed leg 528 presents a separate tooth 532 to each of the contact operating balls 502. However, it is contemplated that the teeth 532 of any given tab be used only in certain predetermined combinations for effecting the control functions to be described at a later point. Therefore, the teeth 532 are readily removable so that such teeth as are not required for setting up desired combinations for ball contact operation may be removed.

Figure 19:
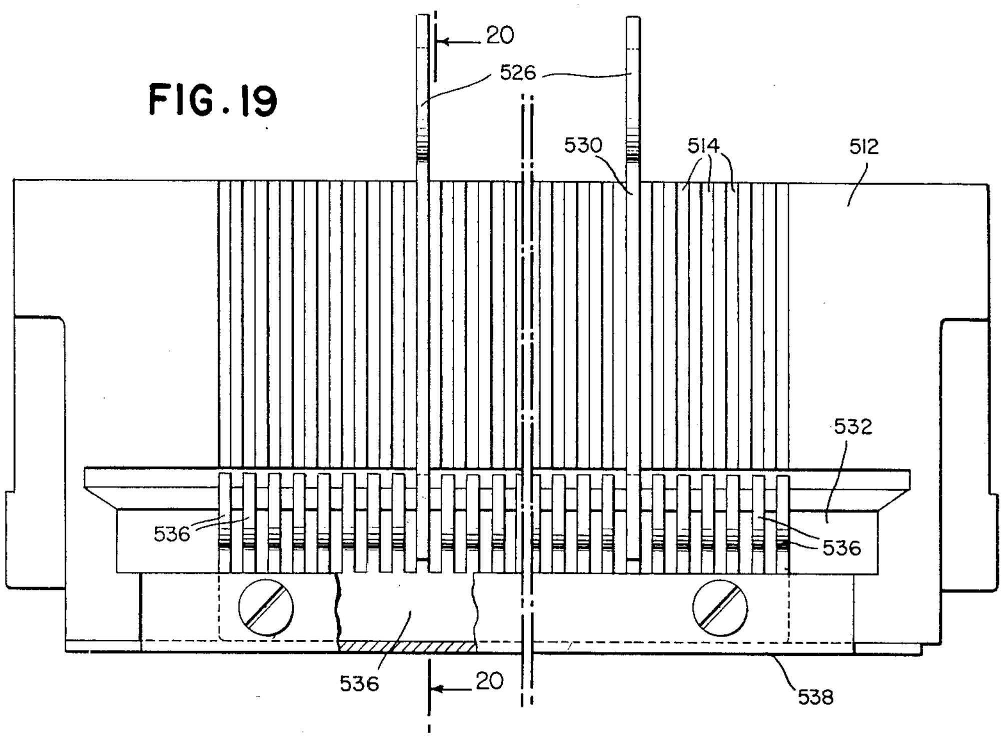
Fig. 19 is an enlarged elevational view taken from the rear of the program control insert bar of Fig. 16.
Figure 20:
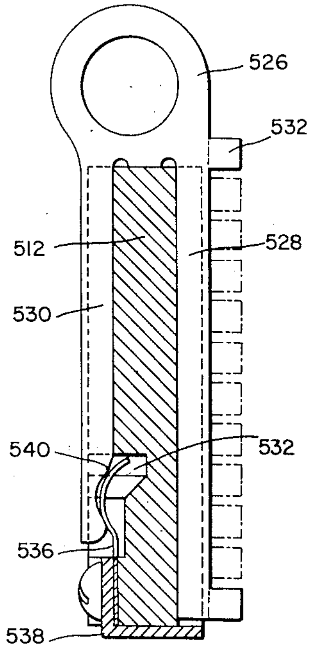
Fig. 20 is a cross-sectional view on line 20—20 of Fig. 19.

The rear face of the program control insert bar as best shown in Figs. 19 and 20 has a recess 534 into which extends a curved spring or series of such springs 536. The spring member 536 is positioned by means of a plate 538 extending along the marginal portion at the bottom of the rear face of the program control insert tab bar 512 and over the bottom edge of said bar.

The leg 530 of the insert tabs 526 has the inner edge thereof shaped to conform generally to the curved portion of the spring member 536 so that when an insert tab 526 has been properly inserted in a groove of the program control insert bar, the curved portion of the spring 536 and the complementary surface 540 of the insert tab leg 530 will be in registration. This provides a more positive hold for the insert tab 526 than would be possible by mere frictional engagement between it and the program control insert bar.

In Fig. 20 of the drawings the insert tab 526 has shown thereon two teeth 532, the one being at the first position and the other being at the 12th position. As illustrated this insert is prepared for the "punch off" position of program #1, the remaining teeth of the insert shown in dotted lines having been removed for purpose of program coding.

Ordinarily a plurality of tabs 526 will be employed for each program that is desired. As hereinbefore stated there has been illustrated herein six programs, although more or fewer may be employed as the requirements of a given business office may dictate. By way of example it may be stated that six programs may be set up herein by retaining on the insert tabs only those teeth indicated in the following table:

| | Punch On | Punch Off | Auto Space |
|---|---|---|---|
| Program #1 | 1 | 1 and 12 | 1 and 11 |
| Program #2 | 2 | 2 and 12 | 2 and 11 |
| Program #3 | 3 | 3 and 12 | 3 and 11 |
| Program #4 | 4 | 4 and 12 | 4 and 11 |
| Program #5 | 5 | 5 and 12 | 5 and 11 |
| Program #6 | 6 | 6 and 12 | 6 and 11 |

In the above table it will be understood that a plurality of "punch on" and "punch off" or auto-space tabs may be used for each program depending usually on the number of items to be punched into the tape for subsequent punching into the respective fields of a card. The manner in which the "punch on" and "punch off" tabs may be used can be seen by reference to Fig. 25 in which document A represents a business form from which certain items are to be punched into the tape while certain other items are to be omitted. Thus at the top of the document in that figure the plus (+) signs represent a "punch on" tab while the zeros (0) represent a "punch off" tab. Auto control tabs are used as will be made plain hereinafter when items are to be justified. Accordingly each time it is desired to energize the "punch on" circuit through the program ball operated contacts for program #1, for example, a "punch on" tab having the first tooth only thereon will be inserted into the program control insert bar at the first printing of the field of the document in which the item is to appear. By the same token, each time the punch circuit is to be deenergized, a "punch off" tab insert having teeth 1 and 12 only will be inserted into the program control insert bar at the proper carriage position. For the purpose of this illustration the contact operating balls 502 and related tab teeth 532 may be considered as being numbered consecutively from 1 through 12 beginning at the top.

Several programs may be simultaneously set up on the program control insert bar, and these programs may be called into operation by depressing a related program key in an auxiliary keyboard 542. By reference to Fig. 7 the keys 1, 2, 3, 4, 5 and 6 will call into play programs numbered #1 through #6, respectively. Thus, when the program key number 1 is depressed, a contact **1*a*** is closed, thereby completing a circuit through the program unit contacts for program #1. In other words the closure of any of the program key contacts in the auxiliary keyboard will condition the circuits, as will be seen more fully in connection with the description of the control circuit, to render the associated program control circuit operative when actuated through the program ball operated contacts.

Figure 9:
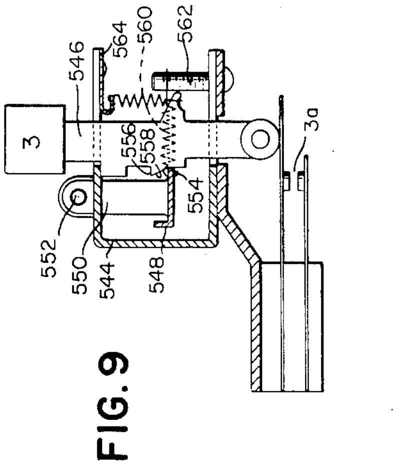
Fig. 9 is a transverse, cross-sectional view on line 9—9 of Fig. 7.

The auxiliary keyboard 542 comprises a generally U-shaped frame 544 in which the key stems 546 operate. Since certain of the keys of the auxiliary keyboard 542 must remain in depressed position for proper operation, there has been provided herein means for latching such keys in depressed position. The latch means consists of a bail 548 having upturned ends 550 through which pass pivot studs 552. By reference to Fig. 7 it will be seen that the bail 548 is disposed in a pendant position at the rear of the key stems 546. The bail has a forwardly extending latching shoulder 554 which is adapted to engage a shoulder 556 (Figs. 8 and 9) that is formed in the rear edge of the key stems 546. The key stem edge immediately below the shoulder 556 has a camming surface 558 which engages the latching shoulder 554 of the latch bail, and each associated key lever is thereby conditioned to rock the latch bail in a clockwise direction about its pivot studs 552. A pair of springs 560 (Fig. 7) tend to hold the bail 548 in key latching position, one end of the springs being attached to the bail and the other being attached to an anchor stud 562.

The stem of each of the keys extends through aligned slots in the parallel legs of the U-shaped frame 544. Carried by the upper leg of the U-shaped frame is a spring anchor 564, and each key stem 546 has a forwardly projecting lug 566. Springs 568 interconnect the spring anchor 564 and the stem lugs 566 and exert an upward force on the key stems effective to hold a stem shoulder 570 in contact with the upper leg of the U-shaped frame 544 whenever the key is in its normally non-depressed position.

Certain of the keys in the auxiliary keyboard, of which momentary depression only is required, are outside the influence of the latch bail 548.

Figure 7:
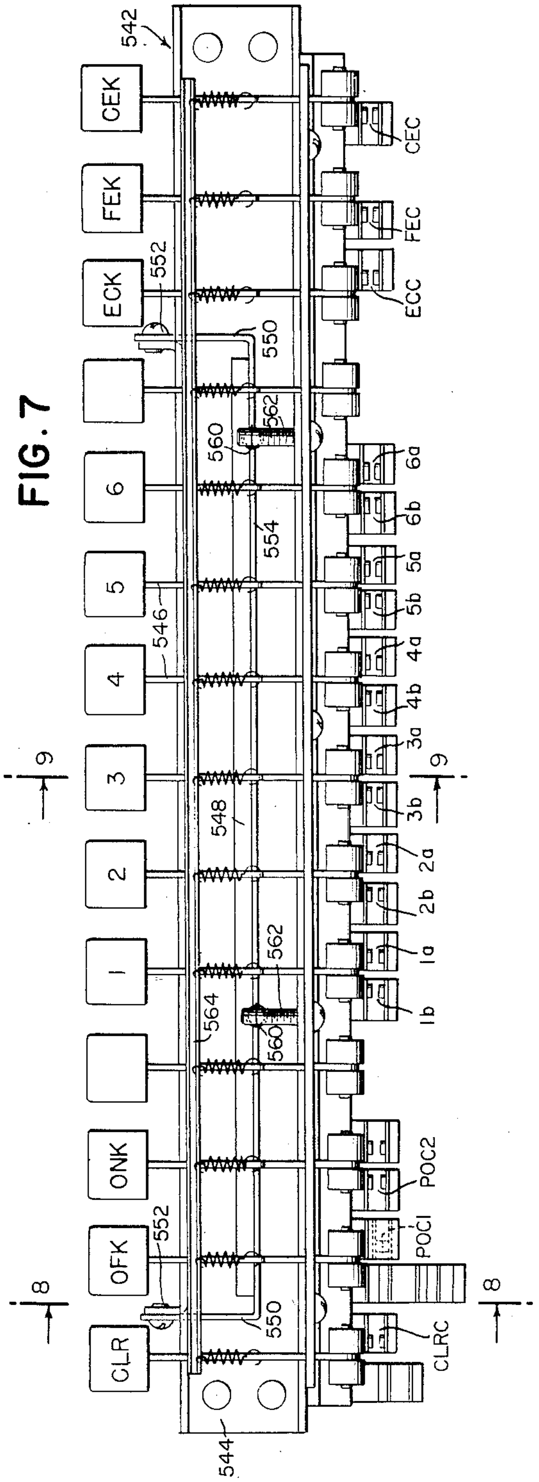
Fig. 7 is an elevational view of the auxiliary keyboard and associated contacts forming a part of the modified typewriter unit.
Figure 8:
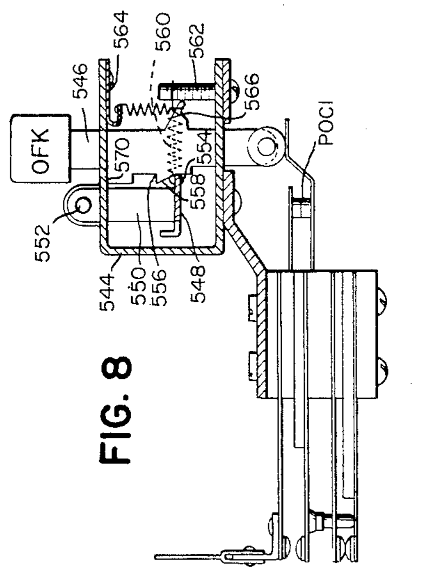
Fig. 8 is a transverse, sectional view on line 8—8 of Fig. 7.

In Fig. 7 of the drawings each of the program keys 1 through 6 controls program key contacts. The contact 1*a* has heretofore been mentioned, and it is to be observed that each of the program key contacts has a key contact similar thereto to which the reference characters 1*a* through 6*a* have been applied. Each of the keys 1 through 6 operates a second contact 1*b* through 6*b*, respectively. These latter contacts close circuits to punch program codes into the tape after the end of card key has been depressed as will appear more fully hereinafter.

In addition to the program keys 1 through 6 the auxiliary keyboard also includes a clear key CLR and clear contacts CLRC, a "punch off" key OFK and a "'punch off" contact POC1, a "punch on" key ONK and a "punch on" contact POC2, the latter being effective when closed to punch an 8 hole into the tape after closure of an end of card key ECK, and an end of card key contact ECC, a field error key FEK and a field error key contact FEC, and a card error key CEK controlling a card error contact CEC.

It may be appropriate as a preliminary introduction to the function of the keys of the auxiliary keyboard to mention the following. The clear key CLR when depressed is effective to cause the punching of all seven holes in the tape as long as the key remains depressed. This is common practice at the beginning and end of each section of tape representing a transmission. The clear key is also depressed to clear the machine if it locks up due to failure of the tape perforator to cycle following the operation of any key connected to perforate the tape, or because the operator may have exceeded the speed at which the tape perforator is capable of accepting impulses. When the clear key CLR is depressed to clear the machine for any of these reasons, it will cause the punching of all seven holes in the tape and thus obliterate any code which may have been set up from the key operation which failed to call the tape punch clutch into operation. If the operator should depress the field error key FEK first, when he should have depressed the card error key CEK, it will be found that the card error key is ineffective. Its efficacy may be restored by first operating the clear key CLR and then the card error key CEK.

The "punch off" key OFK disconnects the tape perforator and disables the card error key CEK, the end of card key ECK and clear key CLR, so that the machine will function in the manner of a conventional power operated typewriter.

The "punch on" key ONK connects the tape perforator continuously so that every typewriter key operation will result in the punching of a character into the tape. It may be noted here that whenever the "punch on" key is depressed, the auto spacing function and the field error key FEK are rendered inoperative. These functions will be fully explained in connection with the detailed discussion of these functions at a later point herein.

Depression of any one of the program keys 1 through 6 in cooperation with the associated ball operated contacts and program insert coding serves to connect and disconnect the tape perforator in different patterns at selected positions of the typewriter carriage depending on the manner in which the program is set up by placement of the program insert tabs 526.

The end of card key ECK when depressed will cause the tape punch to make two successive cycles and to return the typewriter carriage automatically. The first cycle will punch a number 1, 2, 3, 4, 5 or 6 hole into the tape, depending upon which program key was depressed at the time the end of card key is operated. Thereafter, a combination 1, 2, 3 code will be punched into the tape to indicate the end of the card. If none of the program keys is depressed at the time the end of card key is depressed, but instead the "punch on" key ONK was down, the tape will be punched with first an 8 hole, and then the 1, 2, 3 holes as above.

Figures 23, 24:
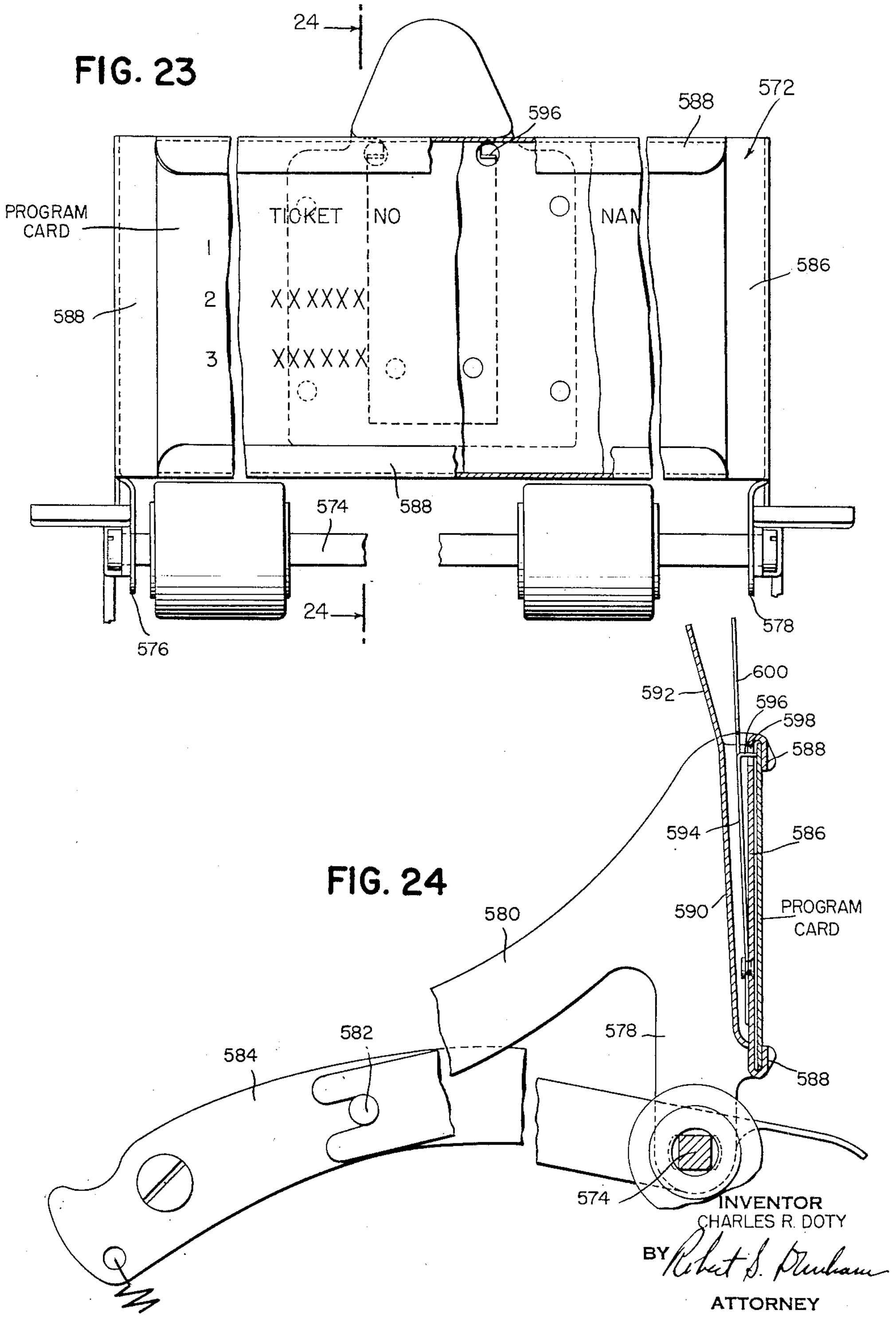
Fig. 23 is an elevational view of a program card holder.
Fig. 24 is a sectional view of the program card holder taken on line 24—24 of Fig. 23.

Mounted for movement with the typewriter carriage is a program chart holder 572. The position of the chart holder in respect to the typewriter in general is shown in Fig. 1 of the drawings, and the details thereof are shown in Figs. 23 and 24. A program chart may be conveniently prepared to show the "punch on" "punch off" positions for each of the programs, and such chart may be inserted into the program chart holder 572 as a visual aid to the operator. The chart holder 572 is mounted on the paper holding bail 574 customarily associated with the platen. To this end the chart holder has a pair of downwardly extending mounting legs 576 and 578 adapted to embrace the paper holding bail 574. A pair of rearwardly extending supporting arms 580 of the chart holder are bifurcated to engage a pin 582 extending inwardly from the paper holder bail arms 584. The chart holder has a chart supporting face 586 which along three edges thereof is turned over upon itself to provide retaining flanges 588 adapted to engage the chart along three of its marginal edges. The fourth side of the holder is open to provide ready access to the chart so that a chart may be removed for easy replacement by another.

Inasmuch as the program chart corresponds to the carriage space positions of the typewriter, it is important that some means be provided for holding the chart within the holder in positive fashion against the danger of lateral movement.

To the back of the supporting face 586 is affixed a backing plate 590 having an upwardly extending finger tab 592. The backing plate 590 is spaced from a chart holder spring base plate 594 which at its lower end is also secured to the chart supporting face 586. The spring plate 594 has a forwardly projecting finger 596 which extends through an aperture 598 formed in the upper portion of the chart supporting face plate 586. Preferably the location of the aperture 598 is behind the down turned flange 588 at the upper edge of the holder.

With the foregoing in mind it is easy to see how a card inserted into the holder will be held securely between the downwardly turned flange 588 and the forwardly projecting finger 596, the resilient quality of the spring plate 594 being such as to exert a considerable clamping pressure against the back of the program card inserted in the holder. In order of release a card for removal or for adjustment in the holder, it is merely required that the spring plate 594 be forced rearwardly, and this can easily be accomplished by engaging the finger tab 592 of the backing plate 590 and an upwardly projecting finger portion 600 of the spring plate 594. Pressure thus exerted will move the spring base plate 594 rearwardly toward fixed back plate 590 to release a program card as desired.

Figure 25:
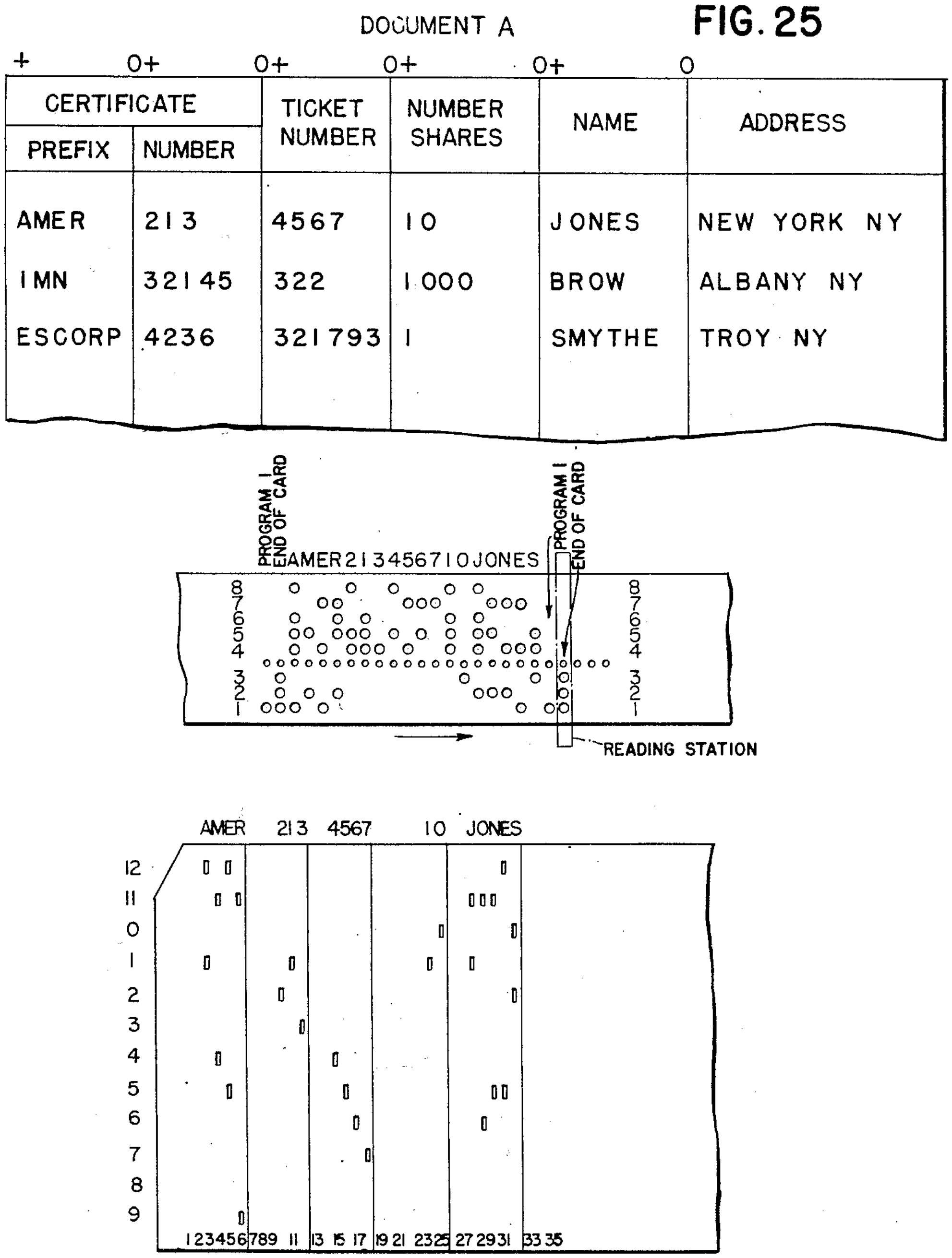
Fig. 25 represents a typed document, related tape section and a perforated record card wherein all data is aligned at the left hand margin of each printed group of the document and at the right hand margin of each field of the punched card, the address of the document having been omitted, however, in the punching of the tape and card.

Before entering into a description of the control circuit which may include practical examples of operative conditions, it may be helpful to describe at this point in brief two essentially different operations the machine is capable of performing. In the first case, as illustrated in Fig. 25 of the drawings, the document represents a listing of a number of transactions in which no requirement exists for accumulating the figures listed within the field limits as indicated by the vertical ruled lines. In the second instance represented by Fig. 26 of the drawings, the document represents an invoice or similar form in which the figures recorded are to be added and the totals are to be printed on the document for ready reference. In such second instance, it is necessary that numerals be justified at the right hand margin of their field, and it is convenient herein that alphabetical descriptions be justified at the left hand margin of their fields.

With reference to document A (the section constituting the upper third of Fig. 25 of the drawings), it may be noted that no attention has been paid to the alignment or right hand margin justification of the numerical data in the data field. In such case the operator simply spaces or tabulates into the first printing position of each field and types true figures beginning at that position. Let it be assumed that program tab inserts 526 have been positioned on the program insert bar 512 at the positions marked by "+" and "0" as indicated at the top of document A in which "+" represents a "punch on" insert tab and "0" represents a "punch off" insert tab. This program of punch control may represent any of the six with which the present machine has been illustrated. Under these conditions every key operation of the typewriter will be recorded in the tape except at the "punch off" positions appearing between data fields and for the address field.

When more than one space remains between the last digit of a field and the first digit of the succeeding field, the carriage is moved under control of the tabulating key 126. Operation of the tabulating key 126 and carriage movement will not record in the tape unless the carriage is standing in an auto space position under which conditions feed holes are punched into the tape. If only one space remains between the last character of a data field and the first character of the succeeding field, the space bar 98 is operated for carriage spacing into the new field. Under such conditions of carriage spacing there is no tape record because the carriage was standing at a "punch off" position when the space bar was struck.

Simultaneously with the punching of the first character in each data field, an 8 hole is recorded in the tape. The 8 hole signals the beginning of the respective data fields. At the end of each line the number 1 hole and the number 1, 2 and 3 holes are punched into the tape to represent the program under control of which the machine is operating and the end of the card, respectively. In the condition illustrated in Fig. 25 of the drawings, it is assumed that operation is under control of program #1.

It is contemplated that tapes produced in the machine illustrated herein be read for control of a card punch such as that shown in the C. R. Doty et al. Patent No. 2,340,801. It has been mentioned heretofore that in the transfer of data from tapes formed herein to cards, the tapes are read in reverse sequence and the cards are punched beginning at column eighty. Accordingly, the card rack of a machine such as that shown in the aforementioned Doty et al. patent is wired to skip from an 8 hole in the tape so that after punching SENOJ the 8 hole will be sensed at the same time the J is sensed, and as a result the card will skip to the last column position of the next field to be punched into the card, in this case "0." This operation permits document typing beginning at the left hand margin of each data group and card punching in which the data is aligned at the right hand margin of each card data field as shown by the card at the bottom of Fig. 25.

Figure 26:
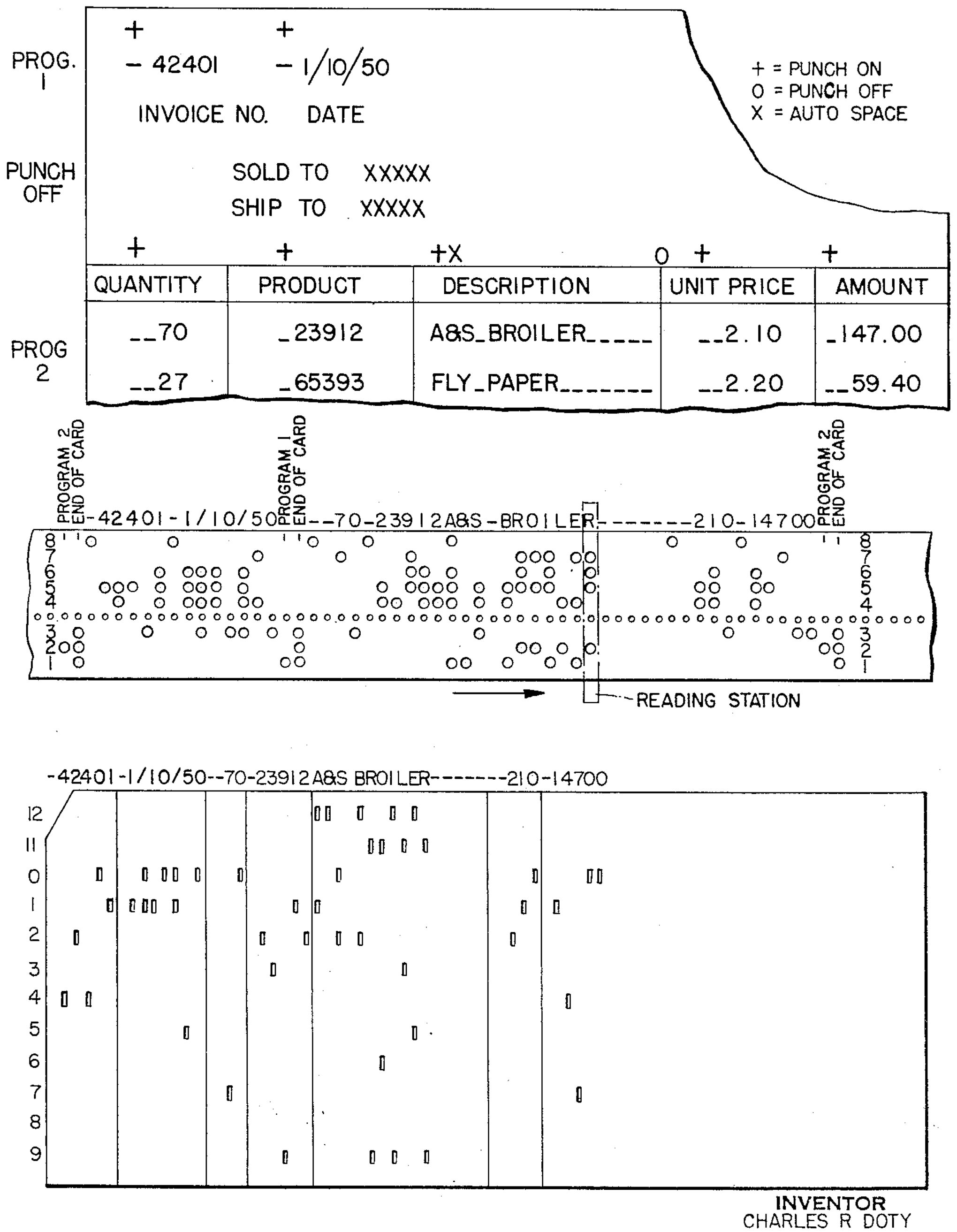
Fig. 26 represents a typed document, a related tape section and a perforated record card in which the numerical data is registered at the right hand margins and alphabetical data at the left hand margins of both the printed form and the punched card.

Fig. 26 of the drawings illustrates a document B, a tape section and a card punched under control of the tape in connection with an invoice or similar form in which the numerical data recorded is to be added and the total is to be printed on the document for ready reference. In such application it is necessary, both in respect to the document and card, that numerals be justified at the right hand margin, and it is convenient herein that alphabetical descriptions be justified at the left hand margin of the description fields. Under these conditions all space bar operations of the typewriter, represented in the drawings by dash marks, must be recorded in the tape. As the data fields are all more than one space apart, the tabulating key is used to move the typewriter carriage from one field to the next. The operation of the tabulating key does not punch any signal into the tape, however, unless operated at a "punch on" insert position, in which case it will punch an "*" (2 hole in the tape) to signal a card skip. Certain punctuation will not be punched into the tape unless the auto space circuit is operative as explained in the following.

With reverse tape reading, in order to position alphabetical data at the left hand position of the field, it is necessary to account, by means of a perforation in the tape, for every printing position on the form. Consequently, in typing the description field, i. e. the third field of document B in Fig. 26, pnnctuation marks, e. g. the and (&) sign in A & S, are punched in the tape as spaces or special characters. In most instances the data recorded in description fields falls short of utilizing the total number of printing positions or card columns provided. Therefore, the unused positions must be recorded in the tape to properly register the data in the card. In the present device the typewriter spaces repeatedly from the last character typed to the next "punch off" position for the particular program in effect. This function follows from a single depression of the tabulating key. The tabulating key is, therefore, arranged to operate the machine differently under different conditions. If the "punch off" key is depressed and the "punch off" contact POC1 is open, depression of the tabulating key will simply tabulate the typewriter carriage. If the "punch on" key is depressed and the "punch on" contacts POC2 closed (other than in a start punch insert position), depression of the tabulating key will merely result in tabulating movement of the carriage. On the other hand, with the "punch on" key depressed at a start punch insert position, and the tab key depressed, the punch will be controlled to punch a 2 hole in the tape and tabulate the typewriter carriage. During auto spacing, i. e. under control of a program tab insert 526 that includes auto space tabs, depression of the tabulating key will auto space the typewriter carriage and punch feed holes in the tape under control of the auto space insert. The several functions briefly described hereinabove including the auto space function will be more fully developed in connection with the description of the control circuit.

In key operated machines where each key stroke representative of a character is immediately punched into a tape, there will always be a certain number of operator's errors involved. Experience indicates that the number of such errors is great enough to warrant the provision of some means to prevent the errors from being punched into a record card which is being processed under control of a tape prepared as in the machine of the instant application. In order to prevent the ultimate punching of cards with unwanted or erroneous information that inadvertently has been punched into the tape, it is necessary to read the tapes in reverse direction so that an error section of the tape can be recognized before card punching takes place. Accordingly the cards are punched at the last column first and progressively toward the first column which is contrary to the conventional practice.

In the operation of the present machine two types of error may occur, one in which the error is detected during the typing of a group of figures which is herein designated as a field error, and the other wherein the error is detected only after the field in which the error occurred has been typed and typing in a subsequent field has been begun. This latter type of error is herein designated as a card error. In order to render certain the correction of such errors upon the discovery thereof, the auxiliary keyboard is provided with a field error key FEK and the card error key CEK, as mentioned briefly hereinabove.

Figures 27, 28:
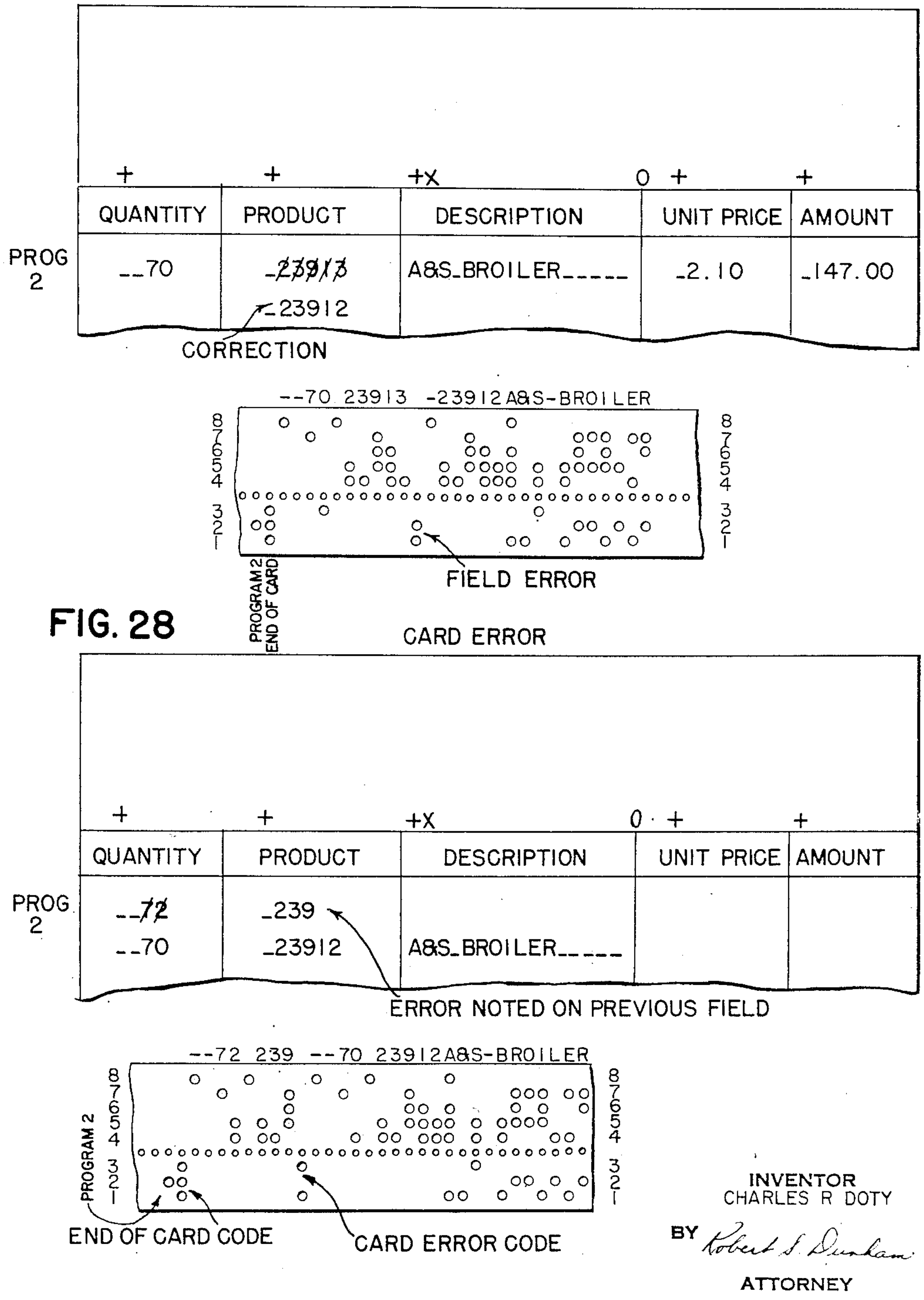
Fig. 27 illustrates the manner in which field errors are corrected.
Fig. 28 represents the manner in which card errors are corrected.
Figure 29:
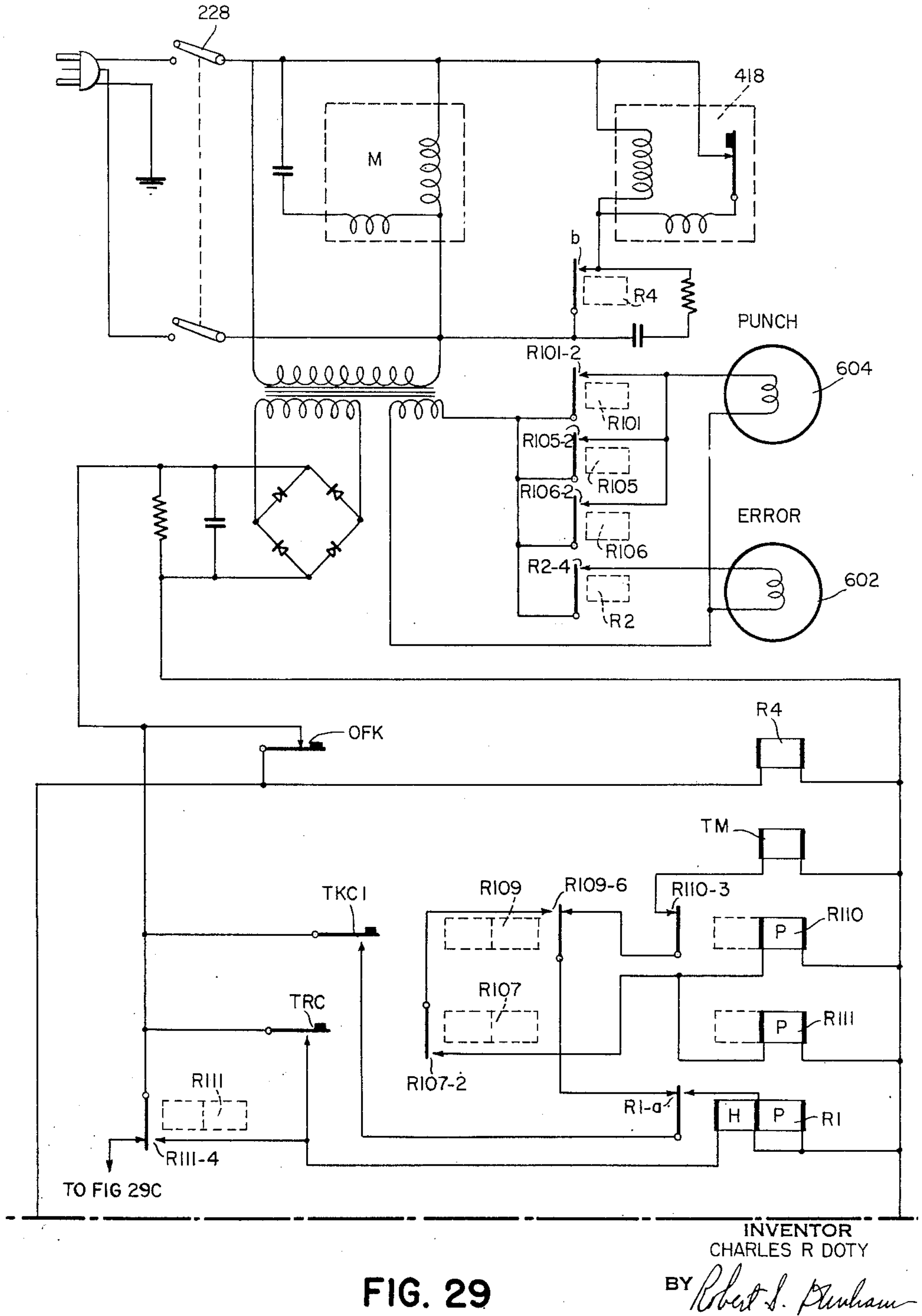
Figure 29A:
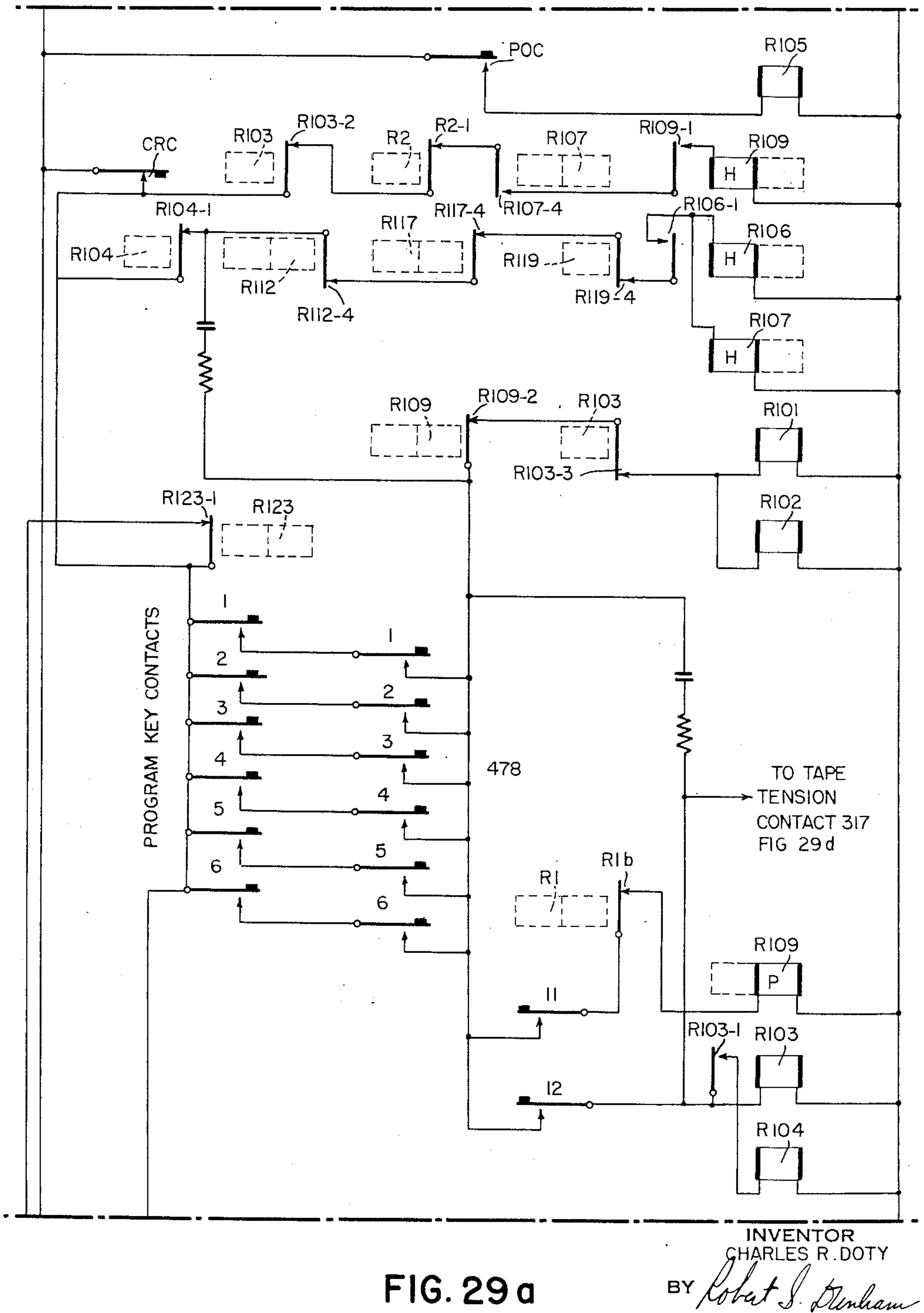
Figure 29B:
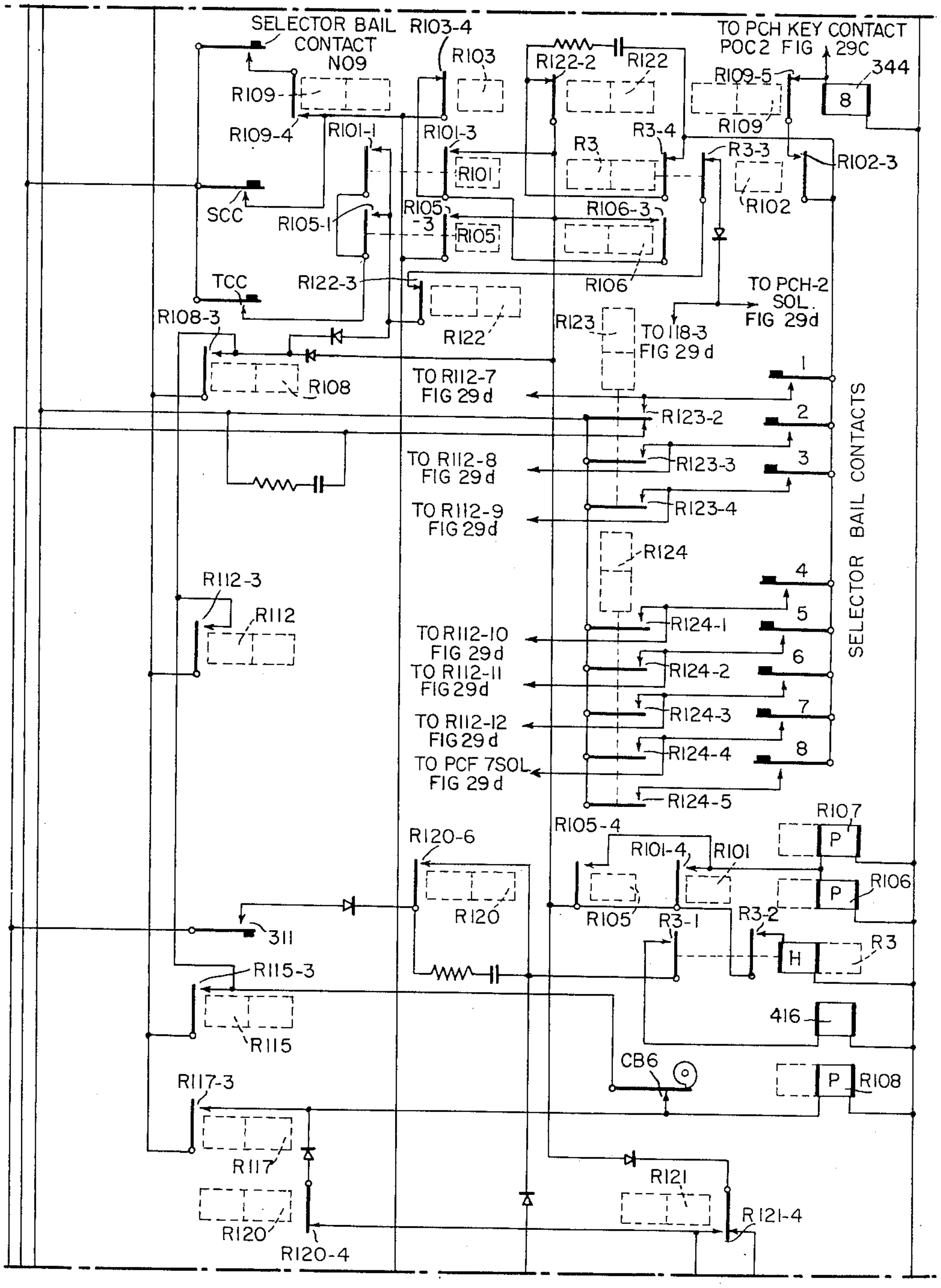
Figure 29C:
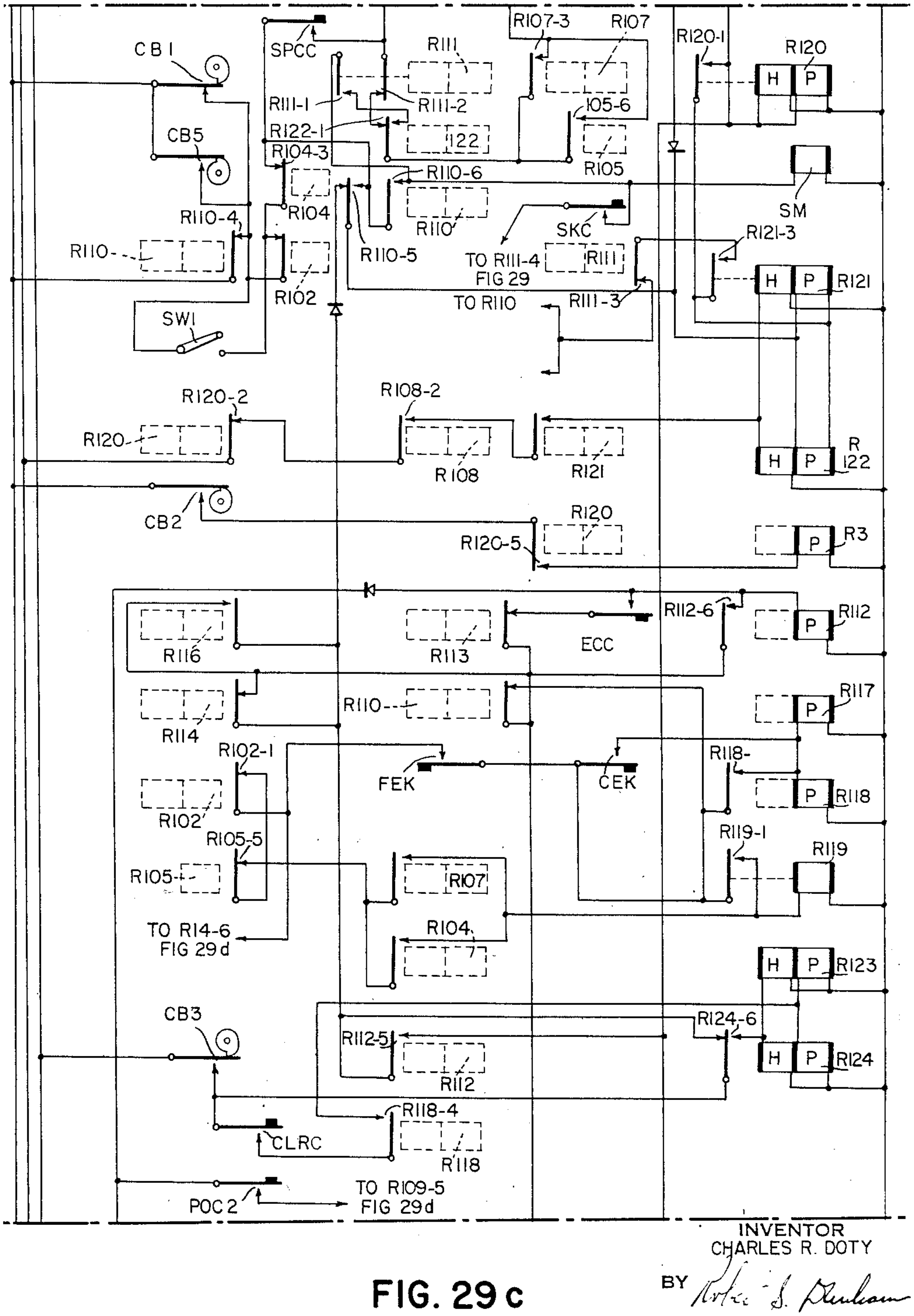
Figure 29D:
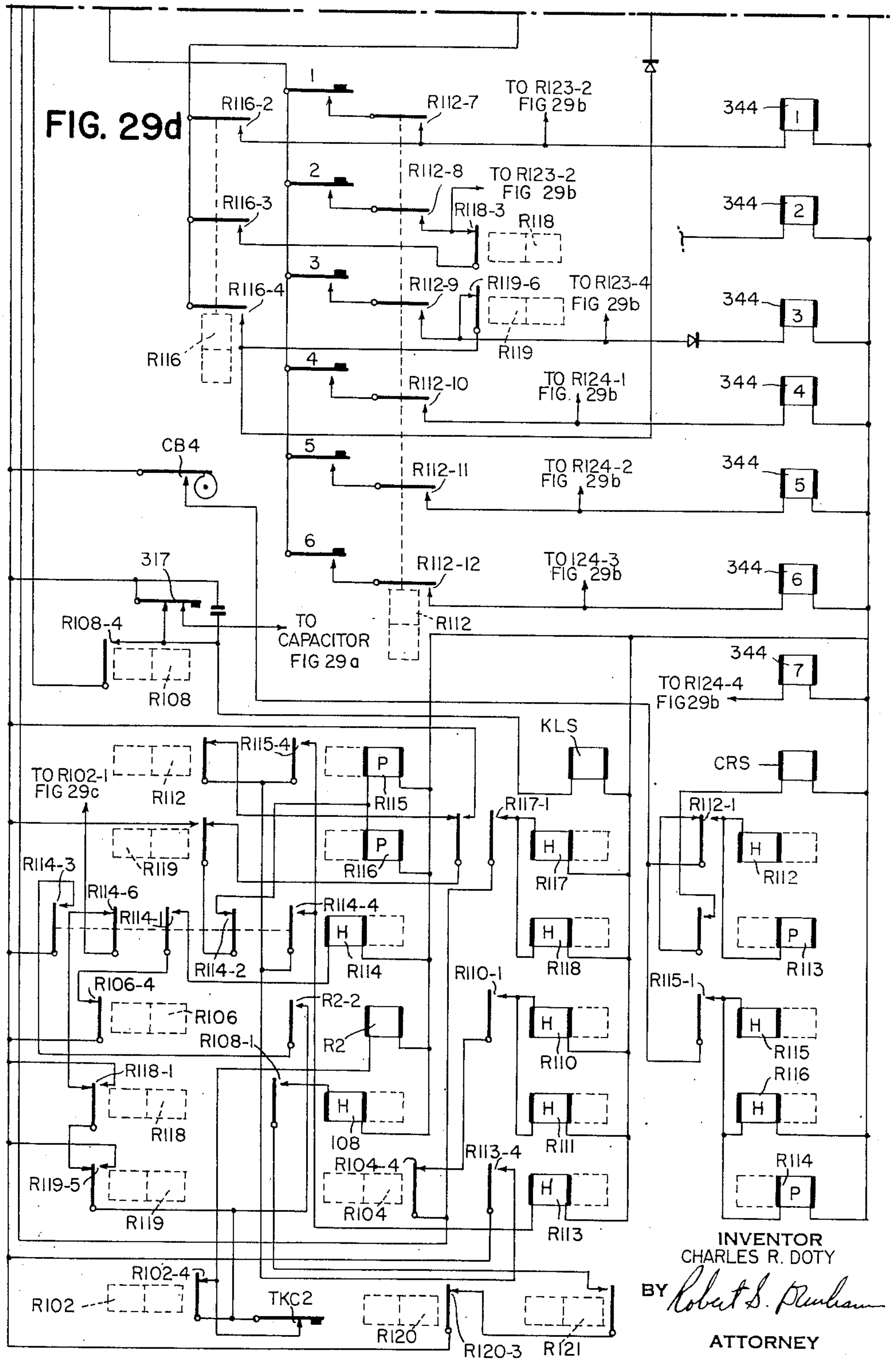

The correction of a field error is graphically illustrated in Fig. 27 of the drawings. If while typing a given field of the document the operator discovers that he has struck the wrong key, he may correct his error and punch into the tape a code which will avoid the reading of the erroneous data punched therein. If the field error key FEK is depressed when the punch is connected, including the "punch off" position, in case the last key struck in the field is in error, an error light 602 (Figs. 1 and 29) will be illuminated and stay on, the punch will be turned off and a field error signal consisting of the 1 and 2 holes will be punched into the tape. If the error light is extinguished upon the release of the field error key, it is a signal to the operator that the punch was not connected at the time the typewriter key was erroneously struck and accordingly the error was not recorded in the tape. Under this condition the field error code (the 1 and 2 holes) is not punched into the tape and the operator will correct his error merely by erasing or otherwise nullifying the document error in any desired manner. If upon release of the field error key the error light 602 remains illuminated, it is a signal to the operator that the error has been punched into the tape and accordingly a warning that steps must be taken to correct the tape error. To correct the tape error, the typewriter carriage must be returned to the "punch on" insert position which is first in the field in which the error occurred. When this position is reached the "punch on" light 604 will be illuminated to indicate that the carriage has been returned to the proper position for effecting correction of the error. Upon completion of the first key stroke the error light will be extinguished to signal the operator that the error condition has been satisfied. Thereafter the field in which the error occurred will be retyped.

When a tape containing error signals is passed through a tape reading mechanism for control of a card punch, the punch will be disabled upon reading of the field error code (the 1 and 2 holes in the tape). The punch will be rendered operative to record the tape column following the one in which the first 8 hole is read.

By particular reference to Fig. 27 of the drawings the document being typed in the typewriter is shown at the top of the figure and the resulting tape section produced in the tape punch is shown at the bottom of the figure. In the second column of the document under the heading "Product" the operator typed the number 23913 erroneously when he intended to type 23912. By reference to the tape section at the bottom of Fig. 27 it will be seen that the erroneous number 23913 has been punched into the tape as a result of the faulty manipulation of the typewriter keyboard. Having discovered his error, however, the operator will depress the field error key FEK with the result that the field error signal code (the 1 and 2 holes of the tape) is punched into the tape. The error light 602 will be illuminated after which the operator moves the carriage back to the next "punch on" position and then proceeds to retype the entire field in which the error appeared.

When the tape is fed through a tape reader in left to right direction, as viewed in Fig. 27, the tape reader will be responsive to the 21932 tape signals, but upon reading the field error signal it will be unresponsive to the erroneous field representing the 31932. Upon thereafter reading the first 8 hole representative of the space between the erroneously punched field and the next following field, i. e. the preceding field in which the number 70 was typed, the tape reader will again be rendered responsive to the tape signals.

A card error is one which is not recognized by the operator until after one or more key strokes have been made following the typing and punching of a complete field. This condition is illustrated in the document and tape section comprising Fig. 28 of the drawings. By reference to the document of Fig. 28 it will be noted that the operator has completed the field of the document in which the error was made and three digits of the second field before the error was discovered in the first field, i. e. the number 72 in this instance was written on the document and punched into the tape, whereas the number 70 was intended. If the card error key CEK is operated at this point the card error code consisting of the 1 and 3 holes will be punched into the tape. Under these conditions the typewriter keyboard locks through operation of the solenoid KLS, and it can be unlocked only by operating the carriage return key to reposition the carriage at the left hand margin of the form. The document may now be corrected in any desired way and the operator proceeds to retype the entire line.

Operation of the card error key CEK in addition to locking the keyboard and to punching the error code (1–3) into the tape also lights the error light 602. These functions take place irrespective of whether the punch is "on" or "off" for a program at the time the card error key is operated. This function is required since the error might be detected while typing with the punch disconnected. Upon typing and punching the first character of the corrected line (a space in this case), the error light is extinguished to signal that the error condition has been recognized.

When the tape section at the bottom of Fig. 28 is read in the tape reading mechanism of a tape to card operation, the tape reader will recognize the card error code (the 1 and 3 holes) which renders the card punch inoperative until the next end of card code is sensed, in this case the perforated 1, 2 and 3 position. Accordingly the corrected number as to quantity, i. e. 70, is punched into the card but the document error and all characters subsequent to the error, i. e. 932–27—, will not be punched into the card.

*Typewriter functions*

*Character printing.*—Depression of a program key will put the punching of the various typewriter functions under the control of a predetermined program. These programs, as briefly stated hereinbefore, can be set up so that only certain portions of the typed line will be punched into the tape. Such portions are designed as "fields." The first position in a punching field is designated as the "punch on" position and is recognized by the machine whenever a program unit contact 478, in series with a selected program key contact, is closed thus energizing the "punch on" control relays R101 and R102. When relays R101 and R102 are energized, normally open R101–2 contact will close, lighting the punch light 604. A typewriter character key stroke in this position will momentarily close the selector common contact SCC and certain of the selector bail contacts SC1—SC7, and since the normally open R101–3 contact is closed, the various circuits necessary for punch operations will be energized.

Thus the No. 8 unch magnet 344 will be impulsed through the now closed normally open R102–3 contact. This punch is used to indicate the start of each punching field on the tape. Certain of the other punch magnets 344 will be impulsed depending upon which selector bail contacts are closed. The "punch on" relays R106 and R107 will be picked up through the now closed normally open "punch on" control relay contact R101–4 and held through the now closed normally open R106–1 contact.

The keyboard lock control relay R108 pick-up coil will be energized and then held through the normally open R108–3 contact in series with the cam contact CB6. The closed normally open R108–4 contact will energize the keyboard lock solenoid KLS. This circuit serves to lock the keyboard in case the punch fails to operate. However, in normal operation the keyboard lock solenoid KLS is slow enough so that it will be deenergized before it can interfere with the typing operation.

Relay R120 will be energized. The normally open R120–6 contact will close, followed shortly thereafter by closure of the punch latch bail contact 311. The latter starts to close upon tripping off any one of the punch magnets 344. As soon as the punch latch bail contact 311 closes, the punch clutch magnet 416 will be impulsed so that shortly thereafter a punch cycle will start.

The normally open R120–1 contact will close, applying positive potential to one side of the pick-up coils of the break control relays R121 and R122 while a similar positive potential is applied to the other side of the R121 and R122 coils under control of the cam contact CB3. When the selector common contact SCC opens, removing the positive potential from one side of the R121 and R122 coils, the positive potential opplied by the cam contact CB3 to the other side of the coils will pick them up in series with relay R120 through the now closed normally open R120–1 contact. The normally open R121–3 contact will close shorting relay R120, thus dropping it out. Shortly thereafter, at 90 degrees of the punch cycle, the cam contact CB3 opens to drop out relays R121 and R122.

This circuit arrangement is used to prevent impulsing the punch magnets 344 with more than one character in those portions of adjacent punch cycles wherein the punches 300 may be tripped, i. e. approximately from 300 degrees of one cycle to 80 degrees of the next. As was shown above a selector common impulse will pick up relay R120 which will condition relays R121 and R122 so that when the impulse ends the latter two relays will pick up under control of the cam contact CB3, thus dropping out relay R120. Another selector common impulse appearing before 90 degrees through the now closed normally open R121–4 contact will take over the control of the pick-up coils of relays R121 and R122 from the cam contact CB3 and also pick up the keyboard lock control relay R108. Relays R121 and R122 will be held under the control of the normally closed contact R123–1 through the now closed normally open R108–2 and R121–1 contacts. Relay R108 will be held under the control of the normally closed clear relay R123–2 contact through the now closed normally open R108–1 and R121–2 contacts. In its turn the keyboard lock solenoid KLS will be held up through the now closed normally open R108–4 contact. This second selector common impulse will be unable to trip any punch magnets since the normally closed R122–2 contact will now be open.

The normally open R120–5 contact closes so that when the cam contact CB2 closes at 20 degrees of the punch cycle, the pick-up coil of the anti-repeat relay R3 will be energized. The normally closed R3–1, R3–3 and R3–4 contacts open, breaking the circuits to the punch clutch magnet 416 and the punch magnets 344. The normally open R3–2 contact closes placing the hold coil of relay R3 under control of the selector common impulse. Relay R3 will drop out either when the cam contact CB2 opens at 90 degrees or when the selector common impulse disappears, depending upon which occurs later in the punch cycle. It can be seen that this circuit prevents further punch operation if the selector common contact SCC fails to open. In addition, if this happens, the typewriter keyboard will lock up since, as the punch clutch approaches the latching point, a continuous selector common impulse will be applied through the closed cam contact CB6 to the keyboard lock control relay R108.

After typing the first character, the typewriter carriage will move out of the "punch on" position, opening the program unit contacts 478, thus dropping out the "punch on" control relays R101 and R102. The "punch on" relays R106 and R107 remain energized. The normally open R106–2 contact will keep the punch light on while the normally open R106–3 contact will maintain the circuit from the selector common contact SCC to the punch circuits. Thus, subsequent typing operations will result in the same operations as the first with the exception that contact R102–3 now being open, no hole will be punched in the No. 8 position of the tape.

Any punching position except the first may be selected as the beginning of that portion of the field wherein automatic spacing may be initiated. This position is recognized by the machine whenever the program unit contact No. 11 and the program unit contact in series with the selected program key contact are closed, energizing the pick-up coil of the auto space control relay R109. The circuits have been arranged so that a typing operation must have been made in the first punching position, i. e. the "punch on" relays R106 and R107 must be energized before relay R104 can be held up or before the signal to start auto spacing can be accepted.

When selected program unit contacts 478 are closed so as to pick up the auto space control relay R109, the same impulse will energize the "punch on" control relays R101 and R102. To prevent more than a momentary impulse, the normally closed R109–2 contact has been placed in series with relays R101 and R102.

Since the punch magnets 344 will trip on a very short impulse the normally closed R109–5 contact is placed in series with the No. 8 punch to reduce the effect of the momentary closure of the normally open R102–3 contact on this punch magnet.

Certain of the characters will operate only the Nos. 8 and 9 selector bail contacts. In that portion of the field wherein the normally open auto space control contact R109–4 is closed, the typing of a character which operates these two bails will cause a space indication to be punched in the tape.

The "punch off" position is that immediately following the last position of a field wherein punching is desired. It is recognized by the machine whenever the program unit contact No. 12 and the program unit contact in series with the selected program key contact are closed, energizing the "punch off" relays R103 and R104.

When the program unit contacts are closed so as to pick up the "punch off" relays R103 and R104, the same impulse will energize the "punch on" control relays R101 and R102. To prevent more than a momentary impulse, the normally closed R103–3 contact has been placed in series with relays R101 and R102. The normally closed R103–4 contact opens, preventing a selector common impulse in this position from reaching the punching circuits.

The normally closed R103–2 contact opens assuring that the auto space control relay R109 will be quickly deenergized. The normally closed R104–1 contact opens dropping out the "punch on" relays R106 and R107, and the normally open R106–2 contact opens extinguishing the punch light.

The normally open R106–3 contact now opens in parallel with the previously opened "punch on" control relay R101–3 contact, preventing any further selector common impulses from reaching the punching circuits after the program unit has moved beyond the "punch off" position. The normally open R107–4 contact now opens assuring that the auto space control relay R109 cannot be held up until a typewriter function has been performed in the "punch on" position of the next field.

When the "punch on" key ONK is depressed, the "punch on continuously" relay R105 will be energized and all program keys will be up, thus removing the program unit and the associated "punch on control" relays R101 and R102, the auto space control relay R109 and the "punch off" relays R103 and R104 from the punch control circuits. The normally open R105–3 contact closes and provides a circuit for every selector common contact impulse to the punches and the punch control circuits. The normally open R105–2 contact closes, lighting the punch light. The normally open R105–4 contact closes, enabling the first selector common impulse to pick up the "punch on" relays R106 and R107. The purpose in picking up these relays is to drop out the anti-repeat relay R114 as used in the card error and end of card cycles.

Since the "punch on" control relay R102 is deenergized, no selector common impulse can reach the No. 8 punch magnet 344 while punching under control of the "punch on" key. It should be noted that since the auto space control relay R109 cannot be energized with this key depressed, that auto spacing cannot be initiated.

*Space.*—The effect on the punching circuits of the carriage space function in the typewriter will be essentially the same as outlined in the preceding section since the space cam contact SPCC is analogous in performance to the performance of the selector common contact SCC and the punch control circuits are similar. Several differences should, however, be noted.

Closure of the space bar contact SKC will have no effect whenever automatic spacing has been instituted since the normally closed auto space relay R111–4 contact will be open.

In the "punch on" position of a field and under normal operation, the first position space switch SW1 is open allowing the now open normally closed "punch on" control relay R102–2 contact to prevent the space cam contact SKC from impulsing the various punch circuits. Since the "punch on" relays R106 and R107 are not picked up, nothing will keep the punch light on when the carriage moves out of the "punch on" position, dropping out the "punch on" control relays R101 and R102.

The circuit is designed so that unwanted spaces will not be punched into the tape in the event that the operator inadvertently overshoots when spacing in a "punch on" position.

In applications where it is necessary to punch a space indication in the "punch on" position, the first position space switch SW1 must be closed, shorting out the normally closed R102–2 contact. It should be noted that in this case a No. 8 hole will also be punched into the tape, in the same manner as any other typewriter function that punches in the first position of a field.

Except in the "punch on" position no punch magnet 344 is energized by the space cam contact SKC impulse leaving the punch latch bail contact 311 inoperative, making it necessary to impulse the punch clutch magnet 416 directly from the space cam contact SKC through the normally closed break control relay R122–1 contact, the normally open "punch on" relay R107–3 and the normally closed anti-repeat R3–1 contact.

The normally open "punch on continuously" relay contacts R105–3 and R105–6 when closed under control of the "punch on" key ONK will allow every space cam contact impulse to energize the punch clutch magnet 416 as well as the punch control circuits.

*Tabulation.*—The effect on the punching circuits of the typewriter tabulation function is essentially the same as those described in respect to character printing since the function of the tabulating cam contact TKC1 is analogous to the function of the selector common contact SCC and the punch control circuits are similar. Several differences should, however, be noted.

The normally open "punch on" control relay contact R101–1 prevents a tabulating cam contact TKC1 impulse from energizing the punch control circuits at any time except when in a "punch on" position when under control of one of the program keys 1–6.

The normally open "punch on continuously" relay contact R105–1 when closed under control of the "punch on" ONK key will allow every tabulating cam contact impulse to operate the No. 2 punch magnet 344 and the punch control circuits.

Operation of the tabulating key 126 energizes the tabulating solenoid TM which in turn actuates the tabulating cam 134, starting tabulating movement of the carriage. The mechanism that releases the carriage also closes the tabulating rack contact TRC and keeps it closed until the carriage comes to rest. When the tabulating rack contact TRC closes, it picks up the tabulating anti-repeat relay R1. The normally closed **R1–*a* contact opens preventing repeated tabulating key operations from energizing the tabulating solenoid while the carriage is in motion. The normally closed R1–*b* contact opens preventing the auto-space control relay R109 from picking up whenever the program unit senses, during tabulation, an auto space insert tab 526** effective for the selected program. This is necessary since if the carriage stops before a "punch off" position is reached, another tabulating operation would start the carriage to auto-space.

*Auto-spacing.*—The conditions under which auto-spacing may be initiated have been outlined in connection with the description of character printing. It will be assumed for the purposes of this section that these conditions have been fulfilled. Actuation of the tabulating key 126 will cause the typewriter carriage to undergo a series of spacing operations which will stop only when the program unit senses a tab 526 in a "punch off" position. In addition, each one of these spacing operations will punch a space code into the tape.

Actuation of the tabulating key will close the tabulating key contact TKC1, energizing the pick-up coils of the auto-space relays R110 and R111 through the closed auto-space control relay contact R109–6 and normally closed "punch on" relay contacts R107–2. The normally open R110–1 contact closes, energizing the hold coils of relays R110 and R111. The normally open R111–4 contact closes, energizing the hold coil of the tabulating anti-repeat relay R1 thus transferring the **R1–*a* contact. The relay R1 is used in this manner to prevent the immediate and probably undesired operation of the tabulating solenoid TM, in the event the tabulating key contact TKC1 is held closed while the carriage moves into the "punch off" position at the end of the auto-spacing cycles and returns the R109–6 contact and normally closed R110–3** contacts to normal.

The normally closed R110–4 contact opens, placing the auto-space cycle circuits under control of the parallel combination of the cam contacts CB1 and CB5. The R110–5 and normally open R111–1 contacts close, and the normally closed R111–3 contact opens in preparation for subsequent events, and the normally open R110–6 contact closes energizing the space solenoid SM.

Actuation of the carriage spacing mechanism by the space solenoid SM will cause the carriage to move one space and at the same time momentarily closes the space cam contact SPCC, impulsing both the make control relay R120 and the keyboard lock control relay R108.

Relay R108 will pick up and hold through the normally open R108–3 contact under control of the cam contact CB6. The normally open R108–4 contact also closes, picking up the keyboard lock solenoid KLS. This circuit serves to lock the keyboard in case either the space cam contact SPCC failed to open or the punch clutch failed to make a cycle.

Relay R120 will pick up, closing the normally open R120–1 contact thus applying a positive potential to one side of the break control relays R121 and R122. A positive potential has already been applied to the other side of these relay coils through the now closed normally open R110–5 contact under control of the cam contacts CB1 and CB5. When the space cam contact opens, removing the positive potential from one side of the R121 and R122 relay coils, the positive potential applied by the cam contacts CB1 and CB5 to the other side of the coils will pick them up in series with relay R120 through the now closed normally open R120–1 contact. The normally open R121–3 contact will close, but since the normally closed R111–3 contact is now open relay R120 will stay energized. The normally open R122–1 contact also closes, energizing the punch clutch magnet 416 to start a punch cycle.

The principal points of the cyclic operation during auto-spacing are as follows: At 10 degrees, the cam contact CB6 will open and drop out the keyboard lock control relay R108 which in turn will drop out the keyboard lock solenoid KLS. At 50 degrees, the cam contact CB1 will open and drop out the space solenoid SM, the punch clutch magnet 416, the break control relays R121 and R122, and the make relay R120. At 125 degrees, the cam contact CB5 will close and reenergize the space solenoid SM causing the typewriter to start another space cycle. At 225 degrees, the cam contact CB6 will close. At approximately 275 degrees the space cam contact SPCC closes again for about 30 milliseconds, impulsing relays R120 and R108. At 360 degrees the punch clutch latches up and stops, and about 15 milliseconds later the space cam contact SPCC will open and the foregoing sequence is repeated.

The auto-space cycles will continue until the program unit senses a "punch off" insert tab 526 and picks up the "punch off" relays R103 and R104. The normally closed R104–3 contact opens and blocks an additional impulse to the space solenoid SM, thus breaking the chain of events and stopping the auto-space cycle. It can be seen that contact R104–3 must be opened between zero degrees and 125 degrees in order to cut off auto-spacing so that there will be the same number of spaces in the tape as letter space movements of the carriage.

The normally closed R104–1 contact opens, dropping out the auto-space relays R110 and R111 which in turn will drop out the tab anti-repeat relay R1.

*Carriage return.*—The carriage return contact CRC is used to approximate a "punch off" signal thus obviating the necessity of using a "punch off" insert 526 at the end of a line. Since the carriage return contact CRC remains open until the carriage comes to rest, it also prevents the program unit from sensing the program insert tabs or any chance selector unit operation from impulsing the punch magnets while the carriage is in motion.

*Field error.*—Depression of the field error key FEK will have no effect under the following conditions:

When the "punch off" key OFK is depressed removing the power source for the circuits in question; when the normally closed clearing relay contact R124–6 is held open either by continual depression of the clear key CLR or by the failure of the punch clutch to make a cycle after actuation of the clear key CLR; when the normally closed auto-space relay contact R110–2 is open as it is during auto-spacing cycles; or when the normally closed anti-repeat relay contact R114–5 is open as it is after a previous actuation of either of the error keys FEK and CEK or of the end of card ECK.

Depression of the field error key FEK will cause no field error indication to be punched into the tape, but it will energize the error light relay R2 and hence light the error light for only so long as the key is depressed under the following conditions:

When the normally closed "punch on continuously" contact R105–5 is held open by depression of the "punch on continuously" key ONK; when the program unit has moved off of the "punch off" position causing the normally open "punch off" relay contact R104–2 to return to normal; or prior to the closing of the normally open "punch on" relay contact R107–1 caused by the performance of some typewriter function in the first position of the next punching field.

Depression of the field error key FEK any time after performing some typewriter function in the "punch on" position of a punching field or when the program unit is sitting in a "punch off" position will light the error light, extinguish the punch light, and punch a field error code into the tape. The error light will remain on until the typewriter carriage is returned to the beginning of the punching field and the first typewriter operation made. The sequence of events is as follows:

Under the above conditions, either the normally open "punch on" relay contact R107–1 or the normally open "punch off" relay contact R104–2 will be closed allowing the operation of the field error key FEK to energize the field error relay R119 which will be held through the now closed normally open R119–1 contact. The normally closed R119–4 contact opens, and if the program unit is not in the "punch off" position, this contact will drop out the "punch on" relays R106 and R107, otherwise it will have no effect since these relays will already have dropped out. The normally open contact R107–4 now opens and assures that the auto-space control relay R109 hold coil is deenergized. The normally open contact R106–2 now opens thus extenguishing the punch light. The contact R119–5 transfers to hold the error light relay R2, thus lighting the error light through the normally open R2–4 contact. The normally closed R119–6 contact opens and cuts out the No. 3 punch magnet. The normally open R119–2 contact closes energizing the cycle control relays R115 and R116. The normally open R115–3 contact closes energizing the keyboard lock control relay R108 through the cam contact CB6. The normally open R108–4 contact closes and starts to pick up the keyboard lock solenoid KLS. This circuit serves to keep the keyboard locked in case the punch fails to make a cycle. The normally open R116–2 and R116–3 contacts close energizing punch magnets No. 1 and 2. The tripping of these magnets starts closing the punch latch bail contact 311. The normally open R116–4 contact closes energizing the make control relay R120. The normally open R120–6 contact closes shortly followed by the punch latch bail contact 311 thus energizing the punch clutch magnet 416 and starting a punch cycle.

The cyclic operation of the field error function is as follows:

At 10 degrees, the cam contact CB6 opens deenergizing the keyboard lock control relay R108 which in turn drops out the keyboard lock solenoid KLS. At 20 degrees, the cam contact CB2 closes impulsing the anti-repeat relay R3 through the now closed normally open R120–5 contact. Between 60 degrees and 70 degree the normally closed R3–1 contact will be open thus deenergizing the punch clutch magnet 416. At 80 degrees the cam contact CB4 closes energizing both the hold coils of the cycle control relays R115 and R116 and the pick-up coil of the anti-repeat relay R114 through the previously closed cycle control relay R115–1 contact. Relay R114 will be held through the previously closed "punch on" relay R106–4 contact and the now closed normally open R114–1 contact. The normally open R114–3 contact now closed serves to hold the error light relay R2 thus keeping the error light on until the end of the error cycle. The normally closed R114–6 contact opens to prevent a back circuit which would allow the voltage holding error light relay R2 to be applied to the field error relay R119. The now open normally closed R114–5 contact in parallel with the previously closed cycle control relay contact R116–1 will cause the cam contact CB3 to take the break arc instead of the normally closed R114–5 contact. The normally closed R114–2 contact opens deenergizing the pick-up coil of the cycle control relays R115 and R116.

At 90 degrees of the punch cycle the cam contacts CB2 and CB3 open. The former deenergizes the anti-repeat relay R3, while the latter deenergizes the field error relay R119, the Nos. 1 and 2 punch magnets and the make control relay R120. At 150 degrees the cam contact CB4 opens and deenergizes the hold coils of the cycle control relays R115 and R116 and the pick-up coil of the anti-repeat relay R114. Relays R115 and R116 will drop out since their pick-up coils were previously deenergized. Relay R114 will continue to be held up as outlined above. At approximately 240 degrees the punch latch bail contact 311 will be restored to its normally open condition. At 225 degrees the cam contact CB6 will close, but since the normally open cycle control relay R115–3 contact will be open, the keyboard locking controls will not be affected. At 280 degrees the cam CB3 will close, but since both the normally closed anti-repeat relay contact R114–5 and the cycle control contact R116–1 are open, continued or repeated closure of the field error key FEK will have no effect. At 360 degrees the punch cycle will be completed and the punch clutch will latch up and stop.

The error correction is accomplished by moving the typewritter carriage either manually or by carriage return key operation so that the program unit is returned to the first position of the punching field in question, and repeating correctly all the typewriter functions required in this field. Moving to the first position of the field will cause the program unit to pick up the "punch on" control relays R101 and R102, thus lighting the punch light through the now closed normally open R101–2 contact.

A typewriter function performed in the "punch on" position will pick up the "punch on" relays R106 and R107 as described hereinabove. This opens the normally closed R106–4 contact, dropping out the anti-repeat relay R114. The opening of the now closed normally open R114–3 contact will then drop out the error light relay R2, extinguishing the error light.

*Card error.*—Depression of the card error key CEK will have no effect under the following conditions:

When the "punch off" key OFK is depressed removing the power source for the circuits in question; when the normally closed clearing relay contact R124–6 is held open either by continual depression of the clear key CLR or by the failure of the punch clutch to make a cycle after actuation of the clear key CLR; when the normally closed auto-space relay contact R110–2 is open as it is during auto-spacing cycles; when the normally closed anti-repeat relay contact R114–5 is open as it is after a previous actuation of either of the error keys FEK and CEK or the end of card key ECK.

Depression of the card error key CEK any time except as noted above will light the error light, extinguish the punch light (except when operating with the "punch on continuously" key ONK depressed), lock up the typewriter keyboard and punch a card error code into the tape. The sequence of events for the foregoing is as follows:

The depression of the card error key CEK will pick up the card error relays R117 and R118 which will hold through the normal open R117–1 contact. The normally closed R117–4 contact opens, assuring that the "punch on" relays R106 and R107 will be deenergized. This in turn will assure the deenergizing of the auto-space control relay R109 by opening the now closed normally open "punch on" relay contact R107–4. The dropping of the "punch on" relays R106 and R107 will extinguish the punch light by opening the now closed normally open R106–2 contact.

It should be noted that the punch light stays on if either the program unit is in the first position of a punching field wherein the normally open "punch on" control relay contact R101–2 is closed or if the "punch on continuously" key ONK has been depressed thereby closing the normally open "punch on continuously" relay contact R105–2.

The normally open R118–1 contact closes picking up the error light relay R2 thus lighting the error light through the now closed normally open R2–4 contact. The normally open R117–3 contact closes picking up the keyboard lock control relay R108 thereby picking up the keyboard lock solenoid KLS through the now closed normally open R108–4 contact. The normally closed R118–3 contact now opens and cuts out the No. 2 punch magnet. The normally open R117–2 contact now closes energizing the pick-up coil of the cycle control relays R115 and R116. The normally open R116–2 and R116–4 contacts close energizing Nos. 1 and 2 punch magnets and the make control relay R120. The normally open R120–6 contact closes, followed shortly by the punch latch bail contact 311 which is operated by tripping a punch magnet 344. This energizes the punch clutch magnet 416 thus starting a punch cycle.

The cyclic operation of the card error is as follows: At 10 degrees the cam contact CB6 will open and deenergize the keyboard lock control relay R108 which in turn will drop out the keyboard lock solenoid KLS. At 20 degrees the cam contact CB2 closes impulsing the anti-repeat relay R3 through the now closed normally open R120–5 contact. Between 60 degrees and 70 degrees the normally closed R3–1 contact will be open thus deenergizing the punch clutch magnet 416. At 80 degrees the cam contact CB4 closes energizing both the hold coils of the cycle control relays R115 and R116 and the pick-up coil of the anti-repeat relay R114 through the previously closed cycle control relay R115–1 contact. Relay R114 will be held through the previously closed "punch on" relay R106–4 contact and the now closed normally open R114–1 contact. The now closed normally open R114–3 contact serves to hold the error light relay R2 thus keeping the error light on until the end of the error cycle. The now open normally closed R114–5 contact in parallel with the now closed normally open cycle control relay R116–1 contact will cause the cam contact CB3 to take the break arc instead of the normally closed R114–5 contact. The normally closed R114–2 contact opens deenergizing the pick-up coils of the cycle control relays R115 and R116.

At 90 degrees the cam contacts CB2 and CB3 open. The former deenergizes the anti-repeat relay R8 while the latter deenergizes the pick-up coils of the card error relays R117 and R118, the Nos. 1 and 3 punch magnets, and the make control relay R120. Relays R117 and R118 will continue to be held up as outlined above.

At 150 degrees the cam contact CB4 opens deenergizing the hold coils of the cycle control relays R115 and R116 and the pick-up coil of the anti-repeat relay R114. Relays R115 and R116 will drop out since their pick-up coils were previously deenergized. Relay R114 will continue to be held up as outlined above.

At approximately 240 degrees of the punch cycle the punch latch bail contact 311 will be restored to its normally open position. At 280 degrees the cam contact CB3 will close, but since both the normally closed anti-repeat relay R114–5 and the cycle control relay R116–1 contacts are open, continued or repeated closure of the card error key CEK will have no effect. At 360 degrees the punch cycle will be completed and the punch clutch will latch up and stop.

Error correction is accomplished by operating the carriage return key 156 and returning the carriage to the first punching position of the card in question and repeating correctly all the typewriter functions required in this card.

Operating the carriage return key contact CRC drops out the card error relays R117 and R118. The opening of the now closed normally open R117–3 contact will drop out the keyboard lock control relay R108 which in turn through the now closed normally open R108–4 contact will drop out the keyboard lock solenoid KLS.

Returning to the first punching position will cause the program unit to pick up the "punch on" control relays R101 and R102, lighting the punch light through the now closed normally open R101–2 contact.

The above may be disregarded if the "punch on continuously" key ONK is depressed, since under this condition the punch light is always on and the program unit is non-functional.

A typewriter function performed in the "punch on" position will pick up the "punch on" relays R106 and R107 as described heretofore in regard to various typewriter functions. This opens the normally closed R106–4 contact, dropping out the anti-repeat relay R114. The opening of the now closed normally open R114–3 contact will then drop out the error light relay R2, extinguishing the error light.

*End of card.*—Depression of the end of card key ECK will have no effect under the following conditions: When the punch off key OFK is depressed removing the power source for the circuits in question; when the normally closed clearing relay contact R124–6 is held open either by continual depression of the clear key CLR or by the failure of the punch clutch to make a cycle after actuation of the clear key; or when the normally closed anti-repeat relay contact R114–5 is open as a result of a previous actuation of either of the error keys FEK or CEK or the end of card key ECK.

Depression of the end of card key ECK any time except as noted above will extinguish the punch light, punch into the tape a program code and then an end of card code, and cause an operation of the carriage return solenoid CRS. In case the "punch on continuously" key ONK has been depressed, a code for this rather than for a program will be punched into the tape and in addition the punch light will not be extinguished. The sequence of events for the foregoing is as follows: The depression of the end of card key ECK will energize the pick-up coil of the end of a card relay R112 which will hold through the now closed normally open R112–6 contact. It will also trip off a punch magnet 344 through one of the program key contacts (RH) and its associated R112 contact or through the "punch on continuously" key contact (RH) thus starting the closure of the punch latch bail contact 311. The normally open R112–7 through R112–12 contacts are used for back circuit prevention. The normally closed end of card relay contact R112–4 opens assuring that the punch on relays R106 and R107 will be deenergized. The now closed normally open R107–4 contact opens and assures the deenergizing of the autospace control relay R109. The dropping of R106 and R107 will extinguish the punch light by opening the now closed normally open R106–2 contact.

It should be noted that the punch light will stay on if the "punch on continuously" key ONK has been depressed thereby closing the normally open "punch on continuously" relay R105–2 contact.

The normally open R112–3 contact closes energizing the keyboard lock control relay R108 thereby picking up the keyboard lock solenoid through the now closed normally open R108 contact. This circuit serves to keep the keyboard locked in case the punch fails to make a cycle. Normally open R112–5 contact closes energizing the make control relay R120. The normally open R120–6 contact closes shortly followed by the punch latch bail contact 311, thus energizing the punch clutch magnet 416 and starting a punch cycle.

At 10 degrees the cam contact CB6 opens, deenergizing the keyboard lock control relay R108 which in turn drops out the keyboard lock solenoid KLS. At 20 degrees the cam contact CB2 closes impulsing the anti-repeat relay R3 through the now closed normally open R120–5 contact. Between 60 degrees and 70 degrees, the normally closed R3–1 contact will be open, thus deenergizing the punch clutch magnet 416.

At 80 degrees the cam contact CB4 closes energizing the hold coil of the end of card relay R112 and the pick-up coil of the anti-repeat relay R113 through the previously closed normally open R112–1 contact. The normally open R113–4 contact now closes energizing the hold coil of R113 through the normally closed anti-repeat relay contact R114–4. The normally closed R113–2 contact now opens preventing the end of card key ECK from having any further effect.

At 90 degrees the cam contacts CB2 and CB3 open. The former deenergizes the anti-repeat relay R3 while the latter deenergizes the pick-up coil of the end of card relay R112, the punch magnet 344 controlled by the depression of a program key or the "punch on continuously" key ONK and the make control relay R120. Relay R112 will continue to be held up as outlined above. At 150 degrees the cam contact CB4 opens deenergizing the hold coil of the end of card relay R112 and the pick-up coil of the anti-repeat relay R113. Relay R112 will drop out since its pick-up coil was previously deenergized. Relay R113 will continue to be held up as outlined above. The normally closed end of card relay R112–2 contact will now return to normal, energizing the pick-up coils of the cycle control relays R115 and R116.

At approximately 240 degrees the punch latch bail contact 311 will be restored to its normally open condition. At 255 degrees, the cam contact CB6 closes energizing the keyboard lock control relay R108 through the now closed normally open cycle control relay R115–3 contact thereby picking up the keyboard lock solenoid KLS through the now closed normally open R108–4 contact. This circuit serves to keep the keyboard locked in case the punch fails to make the next cycle.

At 280 degrees the cam contact CB3 closes energizing Nos. 1, 2 and 3 punch magnets and the make control relay R120 through the now closed normally open cycle control relay contacts R116–2, R116–3 and R116–4. The normally open R120–6 contact closes shortly followed by the punch latch bail contact 311 thus energizing the punch clutch magnet 416 so as to allow another punch cycle.

The cyclic operation of the end of card function is as follows: At 10 degrees the cam contact CB6 opens, deenergizing the keyboard lock control relay R108 which in turn drops out the keyboard lock solenoid KLS. At 20 degrees the cam contact CB2 closes impulsing the anti-repeat relay R3 through the now closed normally open R120–5 contact. Between 60 degrees and 70 degrees the normally closed R3–1 contact will be open thus deenergizing the punch clutch magnet 416.

At 80 degrees the cam contact CB4 closes energizing the carriage return solenoid through the closed end of card relay R112–1 and the now closed normally open anti-repeat relay R113–1 contacts, thus actuating the typewriter carriage return mechanism. In addition, the closing of cam contact CB4 also energizes the hold coils of the cycle control relays R115 and R116 and the pick-up coil of the anti-repeat relay R114 through the previously closed normally open R115–1 contact. Relay R114 will be held through the previously closed "punch on" relay R106–4 contact and the now closed normally open R114–1 contact.

Normally closed R114–2 contact opens deenergizing the pick-up coils of the cycle control relays R115 and R116. At 90 degrees the cam contacts CB2 and CB3 open. The former deenergizes the anti-repeat relay R3 while the latter deenergizes the Nos. 1, 2 and 3 punch magnets and the make control relay R120.

At 150 degrees of the punch cycle the cam contact CB4 opens deenergizing the carriage return solenoid CRS, the hold coils of the cycle control relays R115 and R116, and the pick-up coil of the anti-repeat relay R114. Relays R115 and R116 will drop out while R114 will remain held. Since normally closed R114–4 contact is open, the opening of R115–4 contact will drop out the anti-repeat relay R113. It should be noted that even though the R113–2 contact closes, repeated or continual depression of the end of card key ECK will have no effect as the R116–1 and the normally closed R114–5 contact will both be open.

At approximately 240 degrees the punch latch bail contact will be restored to its normally open condition. At 255 degrees the cam contact CB6 will close, but since the cycle control relay R115–3 contact will be open the keyboard locking controls will not be effected. At 280 degrees the cam contact CB3 will close, but since both the normally closed anti-repeat relay R114–5 and the cycle control relay R116–1 contacts are open continued or repeated closure of the end of card key ECK will have no effect.

At 360 degrees the punch cycle will be completed and the punch clutch will latch up and stop. A short time after the completion of the punching cycles as outlined above, the typewriter carriage will have finished its return travel. The first typewriter function in a "punch on" position will pick up the "punch on" relays R106 and R107, opening the normally closed R106–4 contact thus dropping out the anti-repeat relay R114.

*Clear key.*—The clear key CLR is used for the auto feeding of tape into and out of the punch. The clear key CLR is also used to drop out the keyboard lock and any relays, solenoids or magnets that may have been held up by the failure of the punch to make a cycle or by typing too fast.

The procedure if the keyboard locks up while typing and the carriage has not reached a "punch off" position, is to depress the clear key CLR, return the typewriter carriage to the previous position by use of back space key and repeat the last operation.

The procedure if the keyboard locks up while typing and the carriage has reached or passed a "punch off" position or is sitting in the next "punch on" position, is to depress the clear key CLR and then the field error key FEK. The regular procedure for correcting a field error should then be followed. It should be noted that it is necessary to move the carriage off of the next "punch on" position before actuating the field error key.

The procedure if the keyboard stays locked up preventing the performance of the field error correction or of the end of card cycle, is to depress the clear key and then repeat a field error correction or the end of card cycle.

It should be noted that the clear key is rendered inoperative by the opening of the normally closed card error relay contact R118–4 whenever a card error cycle is instituted. It will be held inoperative until this relay is dropped out by the carriage return key operation. If this relay fails to drop out, the keyboard will stay locked until the power is cut off by the operation of either the typewriter switch or the "punch off" key.

This circuit is devised to prevent the operator from depressing the card error key CEK and then the clear key CLR so as to be able to continue typing without making the correction.

The field error key FEK does not affect the clear key CLR since it is desirable for the operator to be able to clear out the relays set up by the field error key after it was found that the card error key should have been depressed.

The effect of the operation of the clear key on the various punch control circuits may be seen by following the circuit diagrams. Its effect on the punches is as follows:

Closure of the clear key contact CLRC picks up the clear relays R123 and R124 which hold through the now closed normally open R124–6 contact. Selected normally open contacts R123, R124 close, impulsing Nos. 1 through 7 punch magnets as well as the punch clutch magnet. A punch cycle is started and at 90 degrees the cam contact CB3 opens dropping out relays R123 and R124. At 280 degrees the relays R123 and R124 can be impulsed again if desired.

*Punch on key.*—The "punch on" key ONK, when depressed, conditions the circuits so that every operation of the tabulating key, the space bar and any other key that operates the selector unit common contact in conjunction with selector unit bail contacts will cause the tape to be punched with the code for that particular key. The effect on the punch circuits of the performance of any of these operations will be essentially the same as heretofore described.

*Punch off key.*—The "punch off" key OFK, when depressed, serves to cut off the power to all the relays, the program sensing device, the punch magnets, and the punch motor. The latter function is accomplished by dropping out the punch motor control relay, opening the R4B contact in one of the punch motor leads. In other words, this key cuts out everything that is not essential for straight typewriter operation.

*Tape tension and runout interlock.*—The tape tension and runout contact 317 serves the purpose of preventing further typewriter operation whenever the tape breaks or its tension increases to too great a value. This is accomplished by energizing the keyboard lock solenoid KLS thus locking the keyboard. Since locking the keyboard will not effect auto-spacing, the auto-spacing operation is stopped by energizing the "punch off" relays R103 and R104.

*Typical operation*

By way of summary, it may be helpful to consider an example to show the operation of the device. For this purpose reference will be had to Fig. 26 of the drawings wherein the numerical data of the document is in tabular form and the alphabetic data is justified, and to Figs. 29 through 29*d* which illustrate the control circuit.

The operator will place a "punch on" tab 526 in the first printing position of each of the five data fields, a "punch off" tab 525 in the last position of the "description" field, and an auto-space tab 526 in the second position of the "description" field. Let these tab settings represent program No. 2.

The operator will then depress the program No. 2 key and also close the typewriter switch 228. The first thing the operator will notice is that the punch light 604 will come on, and also that closure of the typewriter switch has started the punch motor 418. The punch light was turned on by energization of the "punch on" control relays R101 and R102 which are picked up through the closed program key and the closed program unit contacts 478. The punch light is turned on by the closure of R101–2 relay contact. Another condition in the machine is that the first position space switch SW1 located in the punch is closed. This switch permits a space to be punched in the tape when in the "punch on" position of a field.

The operator will now depress the space bar 98 twice. Actuation of the space bar 98 trips the typewriter space cam 106 which closes the space cam contact SPCC. Closure of this contact energizes two circuits, the first controls the No. 8 punch through normally closed contact R103–4 through the now closed R101–3 contact, the normally closed R122–2 contact, the normally closed contact R3–4, the now closed R102–3 contact and the normally closed contact R109–5 to punch magnet No. 8. The second circuit is from contact R122–2 through now closed R101–4 contact to pick-up relays R106 and R107. Relays R106 and R107 will be held through the normally closed carriage return contact CRC, the normally closed R104–1 and R112–4 contacts, the normally closed R117–4 contact, the normally closed R119–4 contact and the now closed R106–1 contact. Relays R106 and R107 will stay up for the duration of the punching field. In addition the space cam contact impulse also picks up relay R120 through normally closed R121–4 contact. It also picks up the keyboard lock control relay R108 through cam contact CB6. The tripping of punch magnet No. 8 will cause the latch bail contact 311 to close which will impulse the punch clutch magnet 416 through the now closed R120–6 contact and the normally closed R3–1 point. The space cam contact SPCC will also impulse the punch clutch magnet 416 through the normally closed R3–1 point and the now closed normally open R107–3 contact, the normally closed R122–1 contact, and the normally closed R111–2 contact.

This method of impulsing the punch clutch magnet 416 is used in other than a "punch on" position of a field. Since the No. 8 punch magnet is not tripped in any but the first position of a field, the latch bail contact 311 will not close. Thus, this particular circuit serves to by-pass the No. 8 punch magnet under such conditions. At the same time that No. 8 punch magnet is impulsed, the keyboard lock control relay R108 is impulsed through cam contact CB6 as mentioned above. Relay R108 picks up and holds through the normally closed carriage return contact CRC, the now closed R108-3 contact and cam contact CB6. When relay R108 picks up, the keyboard lock solenoid KLS will be energized through the now closed R108-4 contact. This serves as a protection in case the punch fails to operate. Under such circumstances the machine will stay locked up until the condition is corrected.

The hold coil of the keyboard lock control relay R108 will not be energized because the normally closed R120-3 contact will be open and will stay open as long as the space cam contact SPCC is closed. Tripping of the punch clutch will cause the punch shaft 322 to revolve punching a feed hole into the tape. Cam contact CB6 will break at 10 degrees of the punch cycle and drop out the keyboard lock control relay R108 and the keyboard lock solenoid KLS. Thereby, a feed hole will be punched into the tape. With the punching of the first feed hole an 8 hole is also punched into the tape to indicate the beginning of a field. The carriage will move off the "punch on" position, thereby dropping out relays R101 and R102 since the program unit contact 478 will now be open. The space cam contact SPCC opens, which will drop out relay R120.

If the space cam contact SPCC should remain closed beyond 20 degrees of the punch cycle, the relay R3 will be picked up through the closed points R120-5 and cam contact CB2. In such event relay R3 will pick up and hold through its now closed R3-2 contact back to the space cam contact SPCC and will stay closed until the space cam contact breaks. If the space cam contact should fail to open even though the punch operates, the impulse from this contact will be still applied to cam contact CB6 so that when the punch gets to 255 degrees of its cycle, the keyboard lock control relay R108 will again be energized, thus picking up the keyboard lock solenoid KLS. Also as previously, relay R3 will remain up and will be maintained energized by the space cam contact impulse, preventing any further impulse to reach either the selector unit bail contact 311 or punch magnet No. 8.

The second space bar operation will close the space cam contact SPCC as before and will impulse the punch clutch magnet 416 directly through normally closed R111-2 contact, normally closed R122-1 contact, now closed R107-3 contact, and normally closed R3-1 contact. The space cam contact impulse also goes through the normally closed R103-4 contact and through the now closed R106-3 contact to the now open R102-3 contact where it cannot affect punch magnet No. 8. This impulse also energizes relays R120 and R108 as before.

The carriage will advance into the third position of the form and the feed hole will be punched into the tape. The operator now types the digit 7. Operation of the No. 7 typewriter cam causes the first selector unit bail contact No. 7 to close. It also causes the selector common contact SCC to close shortly thereafter. Closure of the selector common contact SCC will impulse the No. 7 punch magnet through the normally closed R103-4 contact, the now closed R106-3 contact, the normally closed R122-2 contact, the normally closed R3-4 contact and the now closed selector bail contact No. 7. The effect of the impulse from the selector common contact on the relays R120, R108 and R3 and on the punch clutch is the same as the space cam contact impulse first noted above. The carriage will advance to the next position and a 7 will be punched into the tape. The operator will then type the next digit, which is zero. The operation will be the same as previously outlined and a zero code will be punched into the tape.

The tabulating key 126 will now be operated. Operation of the tabulating key 126 will close the tabulating key contact TKC1 which will impulse the tabulating solenoid TM through the normally closed R1-*a* contact, the normally closed R109-6 contact, and the normally closed R110-3 contact. The tabulating solenoid TM will trip the typewriter tabulating cam 134 and start the tabulating operation of the typewriter carriage. The tabulating rack contact TRC will be closed mechanically from the tabulating rack mechanism, picking up the relay R1 which will cause the R1-*a* contact to transfer and hold relay R1 as long as either the tabulating key contact TKC1 is closed or the tabulating rack contact TRC is closed. The tabulating rack contact TRC will stay closed until the carriage comes to rest. The R1-*a* point is used in this manner so that in case the tabulating key 126 is held down when the carriage comes to rest, the tabulating solenoid TM will not be immediately impulsed. The tabulating cam contact TCC will close as the typewriter tabulating cam 134 rotates, but since the R101-1 contact is not closed at this position the tabulating cam contact impulse will have no effect on the machine. No tabulating code will be punched in the tape. The carriage will move to the first position of the next punching field, providing a tabulating stop has been placed in this position.

The operations in the second field will be the same as described for the first as far as the circuits are concerned. At the end of the typing in the second field, the operator will again tabulate to the first position of the third or "description" field. When in the "description" field the operator types the first character, an A, it will punch the A code into the tape and operate the various control circuits in the same manner as the first space bar operation did in the previous field.

The carriage will move to the second position of the field wherein the auto-space tab 526 which has been inserted in the program rack will become effective. In this position relay R109 will be picked up through normally closed R1-*b* contact, the now closed No. 11 program unit contact, the No. 2 program unit contact and the No. 2 program key contact. Relay R109 will be held through the now closed R109-1 contact, the now closed R107-4 contact, the normally closed R2—1 contact, the normally closed R103-2 contact and the normally closed carriage return contact CRC. The operator will now type an ampersand. The operation of this key will close selector bail contacts Nos. 8 and 9. Since R109-4 contact is closed, this will allow an impulse to be applied to the punch clutch magnet 416 through the now closed No. 8 selector unit contact, the normally closed R3-4 contact, the normally closed R122-2 contact, the now closed R106-3 contact, the normally closed R103-4 contact, the now closed R109-4 contact and the now closed No. 9 selector bail contact. In addition, the impulse from the No. 9 selector bail contact will operate the various control relays R120, R108, R3, etc., in a manner similar to that during typing of any other character in a punching field. The punch will advance the tape, putting a feed hole or space indication in the tape. The operator will continue typing until the information in that field is finished.

After having typed all the data into the "description" field, the operator will depress the tabulating key 126. Since the carriage is in an auto-space field, and the circuits have been conditioned by the auto-space tab in the second position of the "description" field, operation of the tabulating key will not cause the carriage to tabulate but instead it will start an auto-spacing operation. Closure of the tabulating key contact TKC1 will pick up relays R110 and R111 through the now closed R107-2 contact, the new closed R109-6 contact, and the normally closed R1-*a* contact. The R111-4 contact will close and pick up relay R1 which will be held as long as R111–4 contact or the tabulating key contact is closed. Contact R110–6 will close and impulse the space solenoid SM through normally closed R104–3 contact, the closed first position space switch SW1 and through cam contact CB1. It should be noted that contact R110–4 has opened putting this circuit under the control of cam contacts CB1 and CB5. Operation of the space solenoid SM will trip the space cam 106 which in turn will close the space cam contact SPCC. The space cam contact SPCC will impulse the various control relays as before. Relay R120 will pick up, closing contacts R120–1 thus applying a positive potential to the common side of relays R121 and R122 pick-up coils. When R110–5 contact transferred, it applied positive potential to the left hand side of relay R121 and R122 pick-up coils. Since the potential, under these conditions, is the same on both sides of these relays, they will not operate. The impulse from the space cam contact SPCC cannot directly impulse the clutch at this time since R111–2 contact is open. When the space cam contact opens, the positive potential on the common sides of relays R121 and R122 and on the pick-up side of relay R120 will disappear. Since the positive potential is still applied to the pick-up sides of relays R121 and R122, it will allow relays R121 and R122 to pick up in series with relay R120. Contact R122–1 will transfer and cam contact CB1 impulse the punch clutch magnet 416 through the normally closed R3–1 contact, the now closed R107–3 contact, the transferred R121–1 contact, the now closed R111–1 and R110–6 contacts, the normally closed R104–3 contact, the now closed first position space switch SW1 and cam contact CB1. The punch shaft 322 will start to turn and at 50 degrees of the punch cycle the voltage applied to the punch clutch magnet 416, the space cam contact SPCC, the space solenoid SM, relay R121, relay R122 and relay R120 will be cut off. Relays R120, R121 and R122 will restore to normal. The space solenoid will return to normal.

At 125 degrees of the punch cycle cam contact CB5 will close and apply voltage to the space solenoid SM, and the foregoing cycle will be repeated. This cycle will continue until the carriage auto-spaces into a "punch off" position as determined by the program tab 526 inserted in the last position of the "description" field. Carriage movement into this position will cause relays R103 and R104 to be picked up through the now closed No. 12 program unit contact, No. 2 program unit contact and the No. 2 program key contact. Operation of the "punch off" relay will open R104–3 contact and break the voltage from cam contacts CB1 and CB5, thus interrupting the auto-space cycle. The R103–2 contact opens and drops out the relay R109. Contact R104–4 opens and drops out relays R110 and R111. The "punch off" relay also drops out relays R106 and R107 by opening R104–1 contact. The operator will then tabulate out of the "punch off" spot into the next "punch on" position, and proceed to type the unit price.

While there have been shown and described and pointed out the fundamental novel features of the invention as applied to a single embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In apparatus for punching successive groups of data representing designations into a record sheet, the combination of: a carriage movable successively to different character space representing positions, a keyboard having a plurality of selectively actuatable character representing elements, spacing means operable when actuated to advance said carriage one character representing space position, punch mechanism, means for rendering said punch mechanism active to punch into a record sheet designations corresponding to the characters represented by said keyboard elements when the latter are actuated, normally inactive means operable by said carriage for rendering said punch activating mechanism active and inactive at preselected character space representing positions of said carriage, a control key, means responsive to operation of said key for rendering active said carriage operable means, and means also responsive to operation of said key operative to punch a field designation into the record sheet automatically and simultaneously with the punching of the first character representing designation of each successive group of data representing designations.

2. In apparatus for printing character data on a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, a tabulating key, punch mechanism, means for rendering said punch mechanism active to punch into a record sheet designations representing the characters of said type elements when the latter are actuated, normally inactive means operable by said carriage for rendering said punch activating mechanism active and inactive at preselected character space positions of said carriage, a control key, means responsive to operation of said key for rendering active said carriage operable means, a carriage space punch in said punch mechanism, and means under control of said control key for operating said carriage space punch to punch a plurality of carriage space designations into the record sheet upon a single operation of said tabulating key.

3. In apparatus for printing successive groups of character data in separate fields of a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, punch mechanism, means for rendering said punch mechanism active to punch into a record sheet designations representing the characters of said type elements when the latter are actuated, normally inactive means mounted on said carriage for rendering said punch activating mechanism active and inactive at preselected character space positions of said carriage, a control key, means responsive to operation of said control key for rendering active said carriage mounted means, and means also under control of said control key operative to punch a field representing designation into the record sheet simultaneously with the punching of the first character representing designation in each field.

4. In apparatus for printing character data on a copy sheet and concurrently therewith punching data representing designations in a record sheet, the combination of: printing means including a carriage movable successively to different character space positions, a plurality of selectively actuatable type elements operable when actuated to print corresponding characters, spacing means operable when actuated to advance said carriage one character space position, a space key and a tabulating key, punch mechanism, a plurality of contact devices mounted adjacent said carriage for rendering said punch mechanism active to punch into a record sheet designations representing the characters of said type elements when the latter are actuated, normally inactive means mounted on said carriage for selectively closing certain of said contact devices for rendering said punch activating mechanism active and inactive at preselected character space positions of said carriage, a carriage space punch in said punch mechanism, a control key, means responsive to operation of said control key for rendering active said carriage mounted means, and means under the control of said control key for operating said carriage space punch to punch a carriage space designation into the record sheet upon operation of either said carriage space key or said tabulating key.

5. In apparatus for printing successive groups of character data in separate fields of a copy sheet and concurrently therewith punching data representing designations in a record sheet, the combination of: printing means including a carriage movable successively to different character space positions, a plurality of selectively actuatable type elements operable when actuated to print corresponding characters, spacing means operable when actuated to advance said carriage one character space position, punch mechanism, a plurality of contact devices mounted adjacent said carriage for rendering said punch mechanism active to punch into a record sheet designations representing the characters of said type elements when the latter are actuated, normally inactive means mounted on said carriage for selectively closing certain of said contact devices for rendering said punch activating mechanism active and inactive at preselected character space positions of said carriage, a control key, means responsive to operation of said key to render active said carriage mounted means, and means also under control of said key operative to punch a field representing designation into the record sheet simultaneously with the punching of the first character representing designation in each field.

6. In apparatus for printing character data on a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, a space key and a tabulating key, punch mechanism, a plurality of normally inactive contact devices mounted adjacent said carriage for rendering said punch mechanism active to punch into a record sheet designations representing the characters of said type elements when the latter are actuated, an insert bar mounted on said carriage, a plurality of insert tabs positionable on said insert bar at preselected letter space positions for selectively closing certain of said contact devices during carriage movement, a carriage space punch in said punch mechanism, a control key, and means under control of said control key for conditioning said contact devices for rendering said punch activating mechanism active and inactive by said insert tabs at preselected character space positions and for operating said carriage space punch to punch a carriage space designation into the record sheet upon operation of either carriage space key or said tabulating key.

7. In apparatus for printing character data on a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, punch mechanism, a plurality of contact devices mounted adjacent said carriage for rendering said punch mechanism active to punch into a record sheet designations representing the characters of said type elements when the latter are actuated, an insert bar mounted on said carriage, a plurality of sets of insert tabs positionable on said insert bar at preselected letter space positions for selectively closing certain of said contact devices for rendering said punch activating mechanism active and inactive at preselected character space positions of said carriage, a control key for each of said sets of insert tabs, and means responsive to operation of said keys for selectively rendering operative any one of said sets of insert tabs to select a sheet punching program.

8. In apparatus for printing character data on a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, a space key and a tabulating key, punch mechanism, a plurality of contact devices mounted adjacent said carriage for rendering said punch mechanism active to punch into a record sheet designations representing the character of said type elements when the latter are actuated, an insert bar mounted on said carriage, a plurality of sets of insert tabs positionable on said insert bar at preselected letter space positions for selectively closing certain of said contact devices, for rendering said punch activating mechanism active and inactive at preselected character space positions of said carriage, a control key for each of said sets of insert tabs, and means responsive to operation of said keys for selectively rendering operative any one of said sets of insert tabs to select a sheet punching program, a carriage space punch in said punch mechanism, and means for operating said carriage space punch to punch a carriage space designation into the record sheet upon operation of either said carriage space key or said tabulating key, the operation of said carriage space punch being also under control of each of said control keys.

9. In apparatus for printing character data on a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carirage one character space position, a tabulating key, punch mechanism, a plurality of contact devices mounted adjacent said carriage for rendering said punch mechanism active to punch into a record sheet designations representing the characters of said type elements when the latter are actuated, an insert bar mounted on said carriage, a plurality of sets of insert tabs positionable on said insert bar at preselected letter space positions for selectively closing certain of said contact devices for rendering said punch activating mechanism active and inactive at preselected character space positions of said carriage, a control key for each of said sets of insert tabs, means responsive to operation of said keys for selectively rendering operative any one of said sets of insert tabs to select a sheet punching program, a carriage space punch in said punch mechanism, and means controlled by one of said insert tabs for operating said carriage space punch to punch a plurality of carriage space designations into the record sheet upon a single operation of said tabulating key, the operation of said carriage space punch being also under control of each of said control keys.

10. In apparatus for printing successive groups of characters in separate fields of a copy sheet and concurrently therewith punching data representing designations into a record sheet, the combination of: printing means including a carriage movable successively to different character space positions, a plurality of selectively actuable type elements operable when actuated to print corresponding characters, spacing means operable when actuated to advance said carriage one character space position, punch mechanism, a plurality of contact devices mounted adjacent said carriage for rendering said punch mechanism active to punch into a record sheet designations representing the characters of said type elements when the latter are actuated, an insert bar mounted on said carriage, a plurality of sets of insert tabs positionable on said insert bar at preselected letter space positions for selectively closing certain of said contact devices, for rendering said punch activating mechanism active and inactive at preselected character space positions of said carriage, a control for each of said insert tabs, means responsive to the operation of said keys for selectively rendering operative any one of said sets of insert tabs to select a sheet punching program, and means also under control of any of said control keys operative to punch a field representing designation into the record sheet simultaneously with the punching of the first character representing designation in each field.

11. In apparatus for printing successive groups of character data in separate fields of a copy sheet and concurrently therewith punching data representing designations into a record sheet, the combination of: printing means including a carriage movable successively to different character space positions, a plurality of selectively actuatable type elements operable when actuated to print corresponding characters, spacing means operable when actuated to advance said carriage one character space position, a tabulating key, punch mechanism, means for rendering said punch mechanism active to punch into a record sheet designations representing the characters of said type elements when the latter are actuated, normally inactive means mounted on said carriage for rendering said punch activating mechanism active and inactive at preselected character space positions of said carriage, a control key, means controlled by said control key for activating said carriage mounted means, means also under control of said control key operative to punch a field representing designation into the record sheet simultaneously with the punching of the first character representing designation in each field, a carriage space punch in said punch mechanism, and second normally inactive means also controlled by said control key for operating said carriage space punch to punch a plurality of carriage space designations into the record sheet upon operation of said tabulating key.

12. In apparatus for printing character data on a copy sheet and concurrently therewith punching data representing designations in a record sheet, the combination of: printing means including a carriage movable successively to different character space positions, a plurality of selectively actuatable type elements operable when actuated to print corresponding characters, spacing means operable when actuated to advance said carriage one character space position, a tabulating key, punch mechanism, a plurality of contact devices mounted adjacent said carriage for rendering said punch mechanism active to punch into a record sheet designations representing the characters of said type elements when the latter are actuated, normally inactive means mounted on said carriage for selectively closing certain of said contact devices for rendering said punch activating mechanism active and inactive at preselected character space positions of said carriage, a control key, means responsive to operation of said control key for rendering active said carriage mounted means, a carriage space punch in said punch mechanism, means also under control of said control key for operating said carriage space punch to punch a plurality of carriage space designations into the record sheet upon a single operation of said tabulating key, and means also under control of said control key for rendering said carriage space punch inoperative after a predetermined number of carriage space punch designations have been punched into the record sheet after a single operation of said tabulating key.

13. In apparatus for printing character data on a copy sheet and concurrently therewith punching selected data representing designations into a record sheet, the combination of: printing means including a keyboard and a platen carriage movable successively to different character space positions, a plurality of selectively actuatable type elements operable when actuated to print corresponding characters, spacing means operable when actuated to advance said carriage one character space position, punch mechanism, normally inactive punch control means for said printing means for rendering said punch mechanism active to punch into a record sheet designations representing the characters of said type elements when the latter are actuated, a punch control means programming element mounted for movement in step with said platen carriage operatively associated with said punch control means, a plurality of sets of punch control points, each set comprising a distinctive punch control program on said punch control means programming element at preselected letter space positions for selectively actuating said punch control means for rendering said punch mechanism active and inactive at preselected character space positions of said carriage, a control key in said keyboard for each of said sets of punch control points, means responsive to operation of said keys for selecting one of said sets of control points to render active and inactive said punch control means at character space positions corresponding to the punch control points of the selected program, a key operable to control the punching of a record end designation, and means operable upon operation of said key for also punching a characteristic designation for an operated one of said control keys.

References Cited in the file of this patent

UNITED STATES PATENTS

| | | |
|---|---|---|
| 1,790,479 | Lasker | Jan. 27, 1931 |
| 1,843,772 | Lasker | Feb. 2, 1932 |
| 2,016,686 | Knutson | Oct. 8, 1935 |
| 2,067,183 | Green | Jan. 12, 1937 |
| 2,183,820 | Nelson | Dec. 19, 1939 |
| 2,318,299 | Doty | May 4, 1941 |
| 2,377,801 | Mills | June 5, 1945 |
| 2,390,486 | Doty | Dec. 4, 1945 |
| 2,436,126 | Tholstrup | Feb. 17, 1948 |
| 2,540,027 | Dodge | Jan. 30, 1951 |